United States Patent
Ma et al.

(10) Patent No.: US 7,551,546 B2
(45) Date of Patent: Jun. 23, 2009

(54) DUAL-MODE SHARED OFDM METHODS/TRANSMITTERS, RECEIVERS AND SYSTEMS

(75) Inventors: Jianglei Ma, Kanata (CA); Wen Tong, Ottawa (CA); Ming Jia, Ottawa (CA); Peiying Zhu, Kanata (CA); Dong-Sheng Yu, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1348 days.

(21) Appl. No.: 10/406,207

(22) Filed: Apr. 4, 2003

(65) Prior Publication Data

US 2004/0001429 A1  Jan. 1, 2004

Related U.S. Application Data

(60) Provisional application No. 60/391,624, filed on Jun. 27, 2002.

(51) Int. Cl.
*H04J 11/00* (2006.01)
*H04B 7/216* (2006.01)
*H04L 1/02* (2006.01)

(52) U.S. Cl. .................. 370/208; 370/335; 370/342; 375/267

(58) Field of Classification Search .......... 370/208, 370/308, 240, 310–350; 455/277.1; 375/267, 375/299, 346–348

See application file for complete search history.

(56) References Cited

U.S. PATENT DOCUMENTS

| 5,315,670 | A | * | 5/1994 | Shapiro ................. 382/240 |
| 5,345,439 | A | * | 9/1994 | Marston ................. 370/320 |
| 6,192,026 | B1 | | 2/2001 | Pollack et al. ........... 370/203 |
| 6,282,185 | B1 | * | 8/2001 | Hakkinen et al. ........ 370/342 |
| 6,298,092 | B1 | * | 10/2001 | Heath et al. ............. 375/267 |

(Continued)

FOREIGN PATENT DOCUMENTS

EP  0760560  8/1996

(Continued)

OTHER PUBLICATIONS

Tarokh, Vahid et al., "Space-Time Block Coding for Wireless Communications: Performance Results", Mar. 1999, IEEE Journal on Selected Areas in Communications, vol. 17, No. 3, pp. 451-460.*

(Continued)

*Primary Examiner*—Tri H Phan

(57) ABSTRACT

A wireless terminal and network terminal are provided for implementing a new uplink OFDM protocol. In the new protocol, the wireless terminal has a first transmit chain for generating and transmitting a low rate mode OFDM transmission in a first frequency band of the OFDM band; and a second transmit chain for generating and transmitting a burst-mode transmission in a second frequency band of the OFDM band, the first frequency band being distinct from the second frequency band. An access channel is provided which is overlaid over the low rate mode transmissions of other users.

76 Claims, 17 Drawing Sheets

U.S. PATENT DOCUMENTS

| | | | |
|---|---|---|---|
| 6,606,296 B1* | 8/2003 | Kokkonen | 370/203 |
| 6,967,936 B1* | 11/2005 | Laroia et al. | 370/329 |
| 7,095,708 B1* | 8/2006 | Alamouti et al. | 370/208 |
| 2002/0191569 A1* | 12/2002 | Sung et al. | 370/335 |
| 2004/0203395 A1* | 10/2004 | Chizhik et al. | 455/63.1 |
| 2004/0228267 A1* | 11/2004 | Agrawal et al. | 370/203 |
| 2006/0133522 A1* | 6/2006 | Sutivong et al. | 375/260 |
| 2007/0211790 A1* | 9/2007 | Agrawal et al. | 375/147 |

FOREIGN PATENT DOCUMENTS

| | | |
|---|---|---|
| EP | 0786890 | 1/1997 |
| EP | 1005190 | 11/1999 |
| EP | 1124347 | 1/2001 |
| WO | 9637066 | 5/1996 |
| WO | 9802982 | 1/1998 |
| WO | 0079722 | 6/2000 |
| WO | 0135563 | 5/2001 |

OTHER PUBLICATIONS

Chen, Kwang-Cheng et al, "A Programmable Architecture for OFDM-CDMA", Nov. 1999, National Taiwan University, IEEE Communications Magazine, 0163-6804/99, pp. 76-82.*

T. Chee, Hybric OFDM-CDMA: A Comparison of MC/DS-CDMA, MC-CDMA and OFCDM, Sep. 2002, Dept. of Electrical & Electronic, Adelaide University, Australia, pp. 1-10.*

Hélard, J. -F; Baudais J. -Y; Citerne, J.; Linear MMSE Detection Technique for MC-CDMA; Electronics Letters, Mar. 30, 2000, vol. 36, No. 7.

Callonnec, Denis; Pace, Daniel; Castelain, Damien; Introduction to SFDMA Multiple Access Networks and Their Possible Implementation in Terrestrial DVB Return Channels; IEEE, 1997, pp. 281-285.

Naguib, Ayman, F.; Seshadri, Nambi; Calderbank, A.R.; Applications of Space-Time Block Codes Interference Supression for High Capacity and High Data Rate Wireless Systems; IEEE, 1998, pp. 1803-1810.

* cited by examiner

DUAL-MODE SHARED OFDM METHODS/TRANSMITTERS, RECEIVERS AND SYSTEMS

RELATED APPLICATION

This application claims the benefit of prior U.S. provisional application No. 60/391,624 filed Jun. 27, 2002.

FIELD OF THE INVENTION

This invention relates generally to wireless communications and, in particular, to an uplink air interface used in a wireless communication network, and more particularly to dual-mode shared OFDM methods/transmitters, receivers and systems.

BACKGROUND

A wireless network typically includes access points (e.g. base stations) through which User Equipment (UE) may access the wireless network. Each access point typically services a softly delineated geographic area that is known as a coverage area, in which UE can be used to establish a wireless link with the particular access point. In other words, within a coverage area corresponding to an access point UE can typically expect to be able to communicate (transmit and receive signals) wirelessly with the corresponding access point.

In general, transmissions sent to an access point originating from one or more UE's are collectively known as an uplink (to the access point). This is an example of a many-to-one communication system in which multiple UE's must share access to a common wireless channel. It is difficult to manage multiple-user access to a common wireless channel since respective transmissions originating from different UE's cannot easily be synchronized in practical circumstances. Specifically, in a cellular network, an uplink consists of many point-to-point transmissions that are all directed to a base station (access point) and that originate from respective UE's operating within a cell (coverage area) serviced by the base station.

An access scheme, commonly known as an uplink air interface, must be specified and followed to control the way each UE within a wireless communication network transmits signals to access points (e.g. base stations) so that the common wireless channel is effectively shared by multiple UE's. In cellular networks the uplink air interface must take into account transmissions from multiple UE's operating in the same cell as well as transmissions from UE's operating in adjacent cells. In other words, for wireless communications to be effective a method of dividing the common wireless channel, otherwise known as channelization, must be applied so that each UE can gain transmission access to some portion of the common wireless channel for some reasonable amount of time.

Different multiple-user access schemes have been developed and employed in cellular networks for the uplink air interface. Examples of such multiple-user access schemes include channelization based on: i) frequency division; ii) time division; and iii) code division. According to Frequency Division Multiple Access (FDMA) the common wireless channel is divided into sub-channels, each of which can be dedicated to a single UE. On the other hand, basic Time Division Multiple Access (TDMA) allows multiple users to transmit into the entire common wireless channel one at a time. Code Division Multiple Access (CDMA) allows multiple UE's to transmit into the entire common wireless channel simultaneously by respectively assigning each UE a unique spreading code (cover) that is orthogonal to all other spreading codes assigned to other UE's. In other words, the spreading codes (cover) serve as identifiers or covers that are included in each of the UE's respective transmissions.

The maximum data rate associated with uplink transmission for each of the aforementioned schemes is limited. For example, in 3G (i.e. third generation) cellular networks, based on CDMA, the multiple-access interference inherent to CDMA limits the data rate transmission to 2 Mbps. Moreover, orthogonality between the transmissions from different UE's, provided by the respectively assigned spreading codes, is difficult to maintain since the different UE's do not typically transmit signals synchronously. Once the orthogonality between the transmissions from the different UE's is compromised multiple-access interference is introduced, and this limits the maximum uplink data rate. Generally, in cellular networks the total multiple-access interference can be made up of intra-cell and inter-cell multiple-access interferences.

European digital audio broadcast services and some WLAN (Wireless Local Area Network) uplink access schemes employ a modulation technique known as Orthogonal Frequency Division Modulation (OFDM). OFDM also lends itself to digital television, and is being considered as a method of obtaining high-speed digital data transmission over conventional telephone lines. Advantageously, OFDM allows for simple processing to combat dispersive channel distortions and high speed data rate transmission in broadcast environments and single point-to-point communications. The drawback to OFDM is that it does not inherently provide for multiple-user access despite being very effective for broadcast and single point-to-point communications.

OFDM has been combined with Time Division Multiplexing (TDM) in systems that require multiple-user access. For example, in some WLAN networks OFDM is combined with TDM to provide the multiple access capabilities. Namely, OFDM is used for uplink transmissions from one user at a time, with multiple-user access being arranged in a TDM fashion. However, this type of uplink access scheme cannot effectively support cellular network deployment and mobility because it does not provide the quality of service and features required in cellular networks. In addition, these schemes do not support circuitry data services such as voice.

SUMMARY OF THE INVENTION

According to one broad aspect, the invention provides a wireless terminal for communicating over a shared OFDM band, the wireless terminal comprising: a first transmit chain for generating and transmitting a low rate mode OFDM transmission in a first frequency band of the OFDM band; a second transmit chain for generating and transmitting a burst-mode transmission in a second frequency band of the OFDM band, the first frequency band being distinct from the second frequency band.

In some embodiments, the first transmit chain is power controlled and the second transmit chain is rate controlled.

According to another broad aspect, the invention provides a wireless terminal for communicating over a shared OFDM band, the wireless terminal comprising: a first transmit chain for generating and transmitting a low rate mode OFDM transmission in a first frequency band of the OFDM band; the first transmit chain comprises a hopping pattern generator which causes the first frequency band to hop around in frequency within a subset of the shared OFDM band allocated for low rate mode OFDM transmission.

In some embodiments, the first transmit chain comprises a space time encoder adapted to perform space time encoding to generate a signal to be transmitted during each OFDM transmission interval as said low rate mode OFDM transmission.

In some embodiments, the wireless terminal comprises a plurality N of transmit antennas, N>=2, wherein the first transmit chain comprises a space time encoder adapted to perform space time encoding to generate a respective STC sub-block comprising symbols for M sub-carriers by N transmission intervals to be transmitted on each transmit antenna during each set of N OFDM transmission intervals as said low rate mode OFDM transmission.

In some embodiments, the first transmit chain comprises a hopping pattern generator which causes the first frequency band to hop around in frequency within a subset of the shared OFDM band allocated for low rate mode OFDM transmission and wherein the hopping pattern generates hops with a unit of hopping equal to a size of the STC blocks.

In some embodiments, each STC sub-block further comprises pilot symbols.

In some embodiments, each STC sub-block further comprises N pilot symbols on a respective single sub-carrier on each end of the STC sub-block.

In some embodiments, the first transmit chain further comprises: at least one low rate signal source; for each low rate signal source, at least one distinct orthogonal spreading function adapted to generate a respective spread sequence for each symbol of the low rate signal source by multiplying the symbol by a respective orthogonal spreading function from a set of orthogonal spreading functions; a combiner for adding together in time the spread sequences to generate a composite sequence to be transmitted using said first frequency band.

In some embodiments, the wireless terminal comprises a plurality N of transmit antennas, N>=2, wherein the first transmit chain comprises a space time encoder adapted to perform space time encoding to generate a respective STC sub-block comprising M symbols for sub-carriers by N transmission intervals to be transmitted on each transmit antenna during each set of N OFDM transmission intervals as said low rate mode OFDM transmission, wherein the composite sequence is input to the space time encoder.

In some embodiments, the set of orthogonal spreading functions comprises Walsh codes.

In some embodiments, the at least one low rate signal source comprises at least one of: DL (downlink) channel condition (CQI/CLI) feedback channel; DL ACK/NAK signalling channel; UL (uplink) buffer status channel; UL transmit power margin channel; UL rate indicator channel; UL fixed data rate dedicated traffic channel.

In some embodiments, the wireless terminal further adapts to apply a variable number of Walsh code channels to the at least one low rate signal source as a function of required data rate and/or need for protection.

In some embodiments, the wireless terminal further comprises: a control channel receiver for receiving power control commands in respect of the low rate mode OFDM transmissions; a power control function adapted to apply transmit power adjustments to the low rate mode OFDM transmissions as a function of the power control commands.

In some embodiments, the wireless terminal further comprises a power control function adapted to: transmit an initial access attempt on an uplink access channel; determine a long term estimated downlink power measurement of a signal received over a downlink channel and to initially transmit said low rate mode OFDM transmission a transmit power determined as a function of the estimated downlink power measurement; control channel receiver for receiving power control commands for increasing/unchanging/decreasing transmit power of the low rate mode OFDM transmission after said initial access attempt.

In some embodiments, the wireless terminal further comprises: a control channel receiver for receiving channel assignment information allowing an identification of where in frequency and when in time to transmit the low rate mode OFDM transmissions.

In some embodiments, the wireless terminal further comprises a control channel receiver for receiving channel assignment information allowing an identification of where in frequency and when in time to transmit the low rate mode OFDM transmissions wherein the channel assignment information comprises a hopping pattern identity which allows the wireless terminal to perform hopping in accordance with one of a set of orthogonal hopping patterns.

In some embodiments, the wireless terminal further comprises: a cover code generator adapted to apply a cell specific cover code in generating all low rate mode OFDM transmissions.

In some embodiments, the wireless terminal further comprises: at least one channel coder adapted to apply channel coding to low rate signal sources prior to forming STC blocks.

In some embodiments, the channel coders have a block size that covers several hops to achieve diversity gain and inter-cell interference averaging.

In some embodiments, the STC block size is N×M plus pilot carriers, where M is such that the block size is less than the coherence bandwidth.

In some embodiments, the wireless terminal further comprises: an access channel transmit chain adapted to generate an OFDM access signal occupying a randomly selected slot selected from a plurality of slots comprising a frame, each slot comprising a predetermined block of OFDM time-frequency.

In some embodiments, the wireless terminal further comprises: a control channel receiver for receiving an identity of a plurality of signature definitions for use in a coverage area; wherein the wireless terminal randomly selects one of the plurality of signatures and applies the signature in generating the access attempt.

In some embodiments, each slot comprises four OFDM symbols, and there are 16 different possible signatures.

In some embodiments, the wireless terminal further adapts to map the signature onto OFDM carriers based on a Peano-Hilbert plane filling curve.

In some embodiments, the access channel is overlaid over low rate mode OFDM transmissions of other wireless terminals.

In some embodiments, the wireless terminal adapts to function in an active and standby state, and further comprising: a control channel receiver for receiving a system access channel assignment upon entering the standby state, the system access channel assignment being associated with specific sub-carriers and OFDM symbols to be used as a system access channel; wherein the wireless terminal is further adapted to use the system access channel to transmit a pilot and system access requests while in the standby state.

In some embodiments, the system access channel comprises two or more sub-carriers allocated during certain periodic OFDM symbols.

In some embodiments, the system access channel is used to transmit differentially encoded access requests including at least one state that indicates a request for low rate mode and/or burst mode capacity to be scheduled.

In some embodiments, the wireless terminal further comprises: a second transmit chain for generating and transmitting a burst-mode OFDM transmission transmits occupying an assigned space in OFDM frequency-time.

In some embodiments, the second transmit chain comprises a space time encoder adapted to perform space time encoding to generate a signal to be transmitted during a plurality of OFDM transmission intervals as said burst-mode OFDM transmission.

In some embodiments, the wireless terminal comprises a plurality N of transmit antennas, N>=2, wherein the second transmit chain comprises a space time encoder adapted to perform space time encoding to generate for each of a plurality of assigned STC sub-block transmission frequency-time locations a respective STC sub-block to be transmitted on each transmit antenna.

In some embodiments, each STC sub-block further comprises pilot symbols.

In some embodiments, each STC sub-block further comprises N pilot symbols on each end of the STC sub-block on a respective single OFDM sub-carrier.

In some embodiments, the wireless terminal further comprises a control channel receiver for receiving a downlink signalling channel containing instructions for burst mode transmission.

In some embodiments, the instructions comprise a definition of the assigned STC sub-block transmission frequency-time space and a coding/modulation primitive.

In some embodiments, the instructions further comprise rate control commands, the wireless terminal being adapted to change the coding/modulation primitive according to the rate control commands.

In some embodiments, the wireless terminal further adapts to measure a long term power strength from a serving transmitter and to set a coding/modulation by using multi-level progressive coding and modulation feed forward transmission.

In some embodiments, the second transmit chain comprising a hopping pattern generated which defines said assigned STC sub-block transmission frequency-time locations such that they hop about in frequency within a subset of the shared OFDM band allocated for burst-mode traffic.

In some embodiments, the wireless terminal further comprises: an access channel transmit chain adapted to generate an OFDM access signal occupying a randomly selected slot selected from a plurality of slots comprising a frame, each slot comprising a predetermined block of OFDM time-frequency.

In some embodiments, the wireless terminal adapts to function in an active and standby state, and further comprising: a control channel receiver for receiving a system access channel assignment upon entering the standby state, the system access channel assignment being associated with specific sub-carriers and OFDM symbols to be used as a system access channel; wherein the wireless terminal is further adapted to use the system access channel to transmit a pilot and system access requests while in the standby state.

In some embodiments, the wireless terminal adapts to function in an active and standby state, and further comprising: a control channel receiver for receiving a system access channel assignment upon entering the standby state, the system access channel assignment being associated with specific sub-carriers and OFDM symbols to be used as a system access channel; wherein the wireless terminal is further adapted to use the system access channel to transmit a pilot and system access requests while in the standby state.

According to another broad aspect, the invention provides a wireless terminal for communicating over a shared OFDM band, the wireless terminal comprising: an access channel transmit chain adapted to generate an OFDM access signal occupying a randomly selected slot selected from a plurality of slots comprising a frame, each slot comprising a predetermined block of OFDM time-frequency.

In some embodiments, the wireless terminal further comprises: a control channel receiver for receiving an identity of a plurality of signature definitions for use in a coverage area; wherein the wireless terminal randomly selects one of the plurality of signatures and applies the signature in generating the access attempt.

In some embodiments, each slot comprises four OFDM symbols, and there are 16 different possible signatures.

In some embodiments, the wireless terminal further adapts to map the signature onto OFDM carriers based on a Peano-Hilbert plane filling curve.

In some embodiments, the access channel is overlaid over low rate mode OFDM transmissions of other wireless terminals.

In some embodiments, the wireless terminal adapts to function in an active and standby state, and further comprising: a control channel receiver for receiving a system access channel assignment upon entering the standby state, the system access channel assignment being associated with specific sub-carriers and OFDM symbols to be used as a system access channel; wherein the wireless terminal is further adapted to use the system access channel to transmit a pilot and system access requests while in the standby state.

In some embodiments, the system access channel comprises two or more sub-carriers allocated during certain periodic OFDM symbols.

In some embodiments, the system access channel is used to transmit differentially encoded access requests including at least one state that indicates a request for low rate mode and/or burst mode capacity to be scheduled.

In some embodiments, the wireless terminal further comprises: a second transmit chain for generating and transmitting a burst-mode OFDM transmission occupying an assigned space in OFDM frequency-time.

In some embodiments, the second transmit chain comprises a space time encoder adapted to perform space time encoding to generate a signal to be transmitted during a plurality of OFDM transmission intervals as said burst-mode transmission.

In some embodiments, the wireless terminal comprises a plurality N of transmit antennas, N>=2, wherein the second transmit chain comprises a space time encoder adapted to perform space time encoding to generate for each of a plurality of assigned STC sub-block transmission frequency-time locations a respective STC sub-block to be transmitted on each transmit antenna.

In some embodiments, each STC sub-block further comprises pilot symbols.

In some embodiments, each STC sub-block further comprises N pilot symbols on each end of the STC sub-block on a respective single OFDM sub-carrier.

In some embodiments, the wireless terminal further comprises a control channel receiver for receiving a downlink signalling channel containing instructions for burst mode transmission.

In some embodiments, the instructions comprise a definition of the assigned STC sub-block transmission frequency-time locations and a coding/modulation primitive.

In some embodiments, the instructions further comprise rate control commands, the wireless terminal being adapted to change the coding/modulation primitive according to the rate control commands.

In some embodiments, the wireless terminal further adapts to measure a long term power strength from a serving base station and to set a coding/modulation by using multi-level progressive coding and modulation feed forward transmission.

In some embodiments, the second transmit chain comprising a hopping pattern generated which defines said assigned STC sub-block transmission frequency-time locations such that they hop about in frequency within a subset of the shared OFDM band allocated for burst-mode traffic.

According to another broad aspect, the invention provides a network terminal for receiving communications over a shared OFDM band, the network terminal comprising: a receiver for receiving burst-mode OFDM transmissions over a first subset of the shared OFDM band and for receiving low rate mode OFDM transmissions over a second subset of the shared OFDM band.

In some embodiments, the network terminal further adapts to: extract burst-mode OFDM transmissions of multiple wireless terminals from said first subset and extract low rate mode OFDM transmissions of multiple wireless terminals from the second subset.

In some embodiments, the network terminal further comprises: a control channel output for controlling frequency-time locations with which wireless terminals are to transmit their low rate mode transmissions.

In some embodiments, the control channel identifies to each wireless terminal a respective orthogonal hopping pattern for low rate mode OFDM transmission.

In some embodiments, the network terminal further comprises: a power control function adapted to determine a quality of low rate mode OFDM transmissions for each wireless terminal transmitting low rate OFDM transmissions and to generate power control signals in respect of the low rate mode OFDM transmissions for each wireless terminal transmitting low rate OFDM transmissions.

In some embodiments, the network terminal further adapts to: for each standby wireless terminal in a state, assign a respective system access channel and transmit an identity of the respective system access channel over a control channel; the network terminal being further adapted to monitor the system access channels for requests for capacity from wireless terminals in the standby state.

In some embodiments, the network terminal further adapts to maintain timing and synchronization using the system access channels for wireless terminals in the standby state.

In some embodiments, the requests for capacity can be requests for burst-mode or low rate mode capacity.

In some embodiments, the network terminal further comprises: a control channel output for controlling which wireless terminals are to transmit burst-mode OFDM transmissions.

In some embodiments, control channel output identifies for each wireless terminal to transmit a burst-mode OFDM transmission where in frequency and when in time to transmit the burst-mode OFDM transmission.

In some embodiments, the network terminal further adapts to perform adaptive rate control over the burst-mode transmission.

In some embodiments, the network terminal further adapts to monitor a random access channel, the random access channel comprising: a plurality of slots, each slot comprising a plurality of OFDM symbol intervals, and for each slot a plurality M of signatures such that M access attempts can be received during one slot, the slots being overlaid over transmissions of active wireless terminals.

In some embodiments, the network terminal further adapts to transmit an identity of the signatures for use on the random access channel.

In some embodiments, the network terminal further adapts to grant system access on the basis of detected access attempts on the random access channel.

According to another broad aspect, the invention provides a system comprising: a plurality of wireless terminals in which each wireless terminal is assigned a respective Walsh code, and each user data element produced by the wireless terminal is transmitted on a respective sub-carrier spread in time over multiple OFDM symbols, with multiple wireless terminals transmitting a respective data element simultaneously on the same sub-carrier.

According to another broad aspect, the invention provides a system comprising a plurality of wireless terminals in which: for a given wireless terminal, at least one is Walsh code is assigned for each channel for the wireless terminal, and each user data element of any wireless terminal is transmitted on an OFDM symbol sub-band spread in frequency over multiple OFDM sub-carriers, with multiple of the wireless terminal transmitting simultaneously on the same OFDM symbol sub-band.

According to another broad aspect, the invention provides a method of communicating over a shared OFDM band comprising: generating and transmitting a low rate mode OFDM transmission in a first frequency band of the OFDM band; generating and transmitting a burst-mode transmission in a second frequency band of the OFDM band, the first frequency band being distinct from the second frequency band.

In some embodiments, the method further comprises: receiving power control commands and controlling transmit power of the low rate mode OFDM transmission as a function of the power control commands; receiving rate control commands and controlling transmission rate of the burst-mode OFDM transmission as a function of the rate control commands.

Other aspects of the invention provide respective methods adapted to implement the method of transmitting/receiving/controlling executed by any of the above summarized wireless terminals or base stations.

Other aspects of the invention provide respective systems which include a series of any of the above summarized base stations in combination with a series of any of the above summarized wireless terminals.

Other aspects of the invention provide a respective computer readable medium having instructions stored thereon for executing the method of transmitting/receiving/controlling executed by any of the above summarized wireless terminals or base stations.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

In order to reduce multiple-access interference so that spectral efficiency and high data rate limits in a common wireless channel are increased a method and apparatus for uplink multiple-user access is provided. The method and apparatus disclosed herein are based on Orthogonal Frequency Division Modulation (OFDM) adapted so as to provide an effective uplink multiple-user access scheme that can be used in wireless communication networks. Accordingly, from herein the OFDM-based uplink multiple-user access scheme provided by the invention will be simply referred to as OFDMA (Orthogonal Frequency Division Multiple-Access).

An overall uplink operation design is provided which includes:
- an up link set-up;
- a multiple access scheme;
- a definition of the uplink channel;
- a pilot structure;
- a synchronization strategy;
- a coding modulation scheme, and
- an OFDMA resource allocation strategy.

It is contemplated that embodiments of the invention may be implemented which feature any sub-combination of from one or more to all of the above introduced elements.

Basic Concepts of OFDMA

Figure 2:
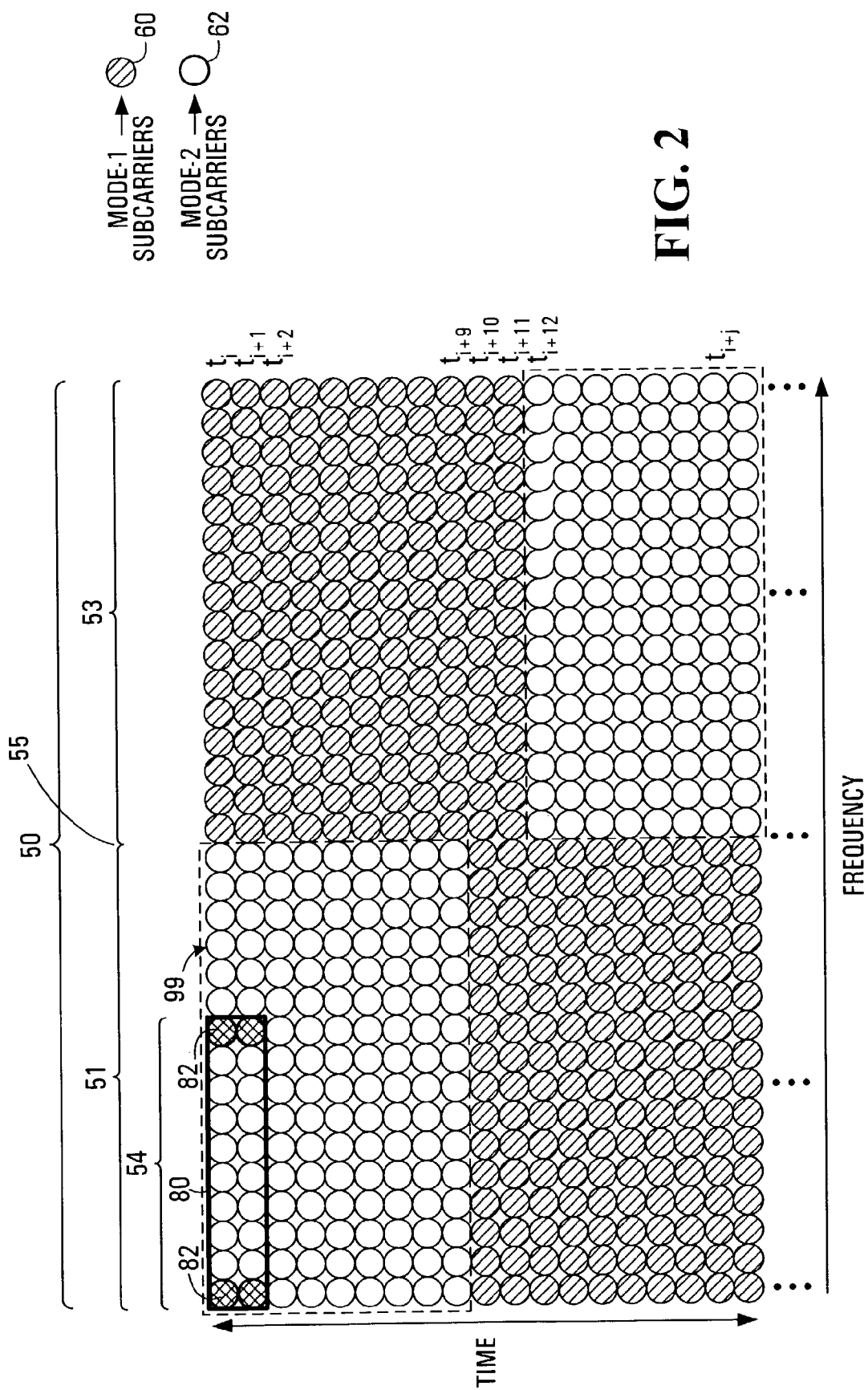
FIG. 2 illustrates an example time-frequency resource allocation within a common wireless channel according to an embodiment of the invention.

Referring now to FIG. 2, illustrated is an example time-frequency resource allocation that is made according to an OFDMA scheme provided by an embodiment of the invention.

The modulation technique employed in OFDMA is OFDM. OFDM is a method of digital modulation in which a set of data is mapped onto the set of OFDM sub-carriers. Each circle in FIG. 2, one of which 99 is identified by way of example, represents the transmission of a single sub-carrier during a single OFDM symbol transmission period. Thus, the horizontal axis in FIG. 2 represents frequency, and the vertical axis represents time with time increasing down the page. In the illustrated example, the OFDM band is shown to contain 32 sub-carriers. It is to be understood that this is only by way of example and that any suitable number of sub-carriers may be employed. The numbers can be quite large, for example 1024. This is a simplified diagram however in that the actual frequency response associated with each of the sub-carriers overlaps substantially. However, with OFDM, the frequency response of each sub-carrier is designed to be orthogonal to that of each other sub-carrier in order to allow data modulated to each sub-carrier to be independently recovered at a receiver.

It is noted that in conventional OFDM, an OFDM symbol is defined to consist of the simultaneous transmission over an entire set of orthogonal sub-carriers defining an OFDM channel. An OFDM symbol is transmitted from a single source to a destination.

According to the OFDMA scheme provided by an embodiment of the invention, a common wireless channel 50 is implemented using an OFDM transmission scheme within an overall OFDM band. However, rather than dedicating the entire OFDM band to a single transmitter, during a given symbol duration, the OFDM band is divided into two frequency bands 51, 53 which can be used interchangeably to provide two different OFDMA modes provided by embodiments of the invention. The two different OFDMA modes are referred to herein generally as Mode-1 and Mode-2 respectively. In the Figure legend, sub-carriers used for Mode-1 are generally indicated by 60, while sub-carriers used for Mode-2 are generally indicated by 62. The first frequency band 51 has the first 16 sub-carriers of the OFDM band 50, while the second frequency band 53 has the second 16 sub-carriers of the OFDM band 50. The details of Mode-1 and Mode-2 will be discussed individually further below. Mode-1 is used to provide low rate circuit oriented connectivity for multiple users simultaneously preferably using orthogonal code separation, while Mode-2 is used to provide higher rate bursty packet connectivity.

FIG. 2 shows an example of time-frequency resource allocation for Mode-1 and Mode-2 which changes over time. For symbol periods $t_i$ through $t_{i+9}$, a first allocation is shown with the first frequency band 51 assigned to Mode-1 traffic and the second frequency band 53 assigned to Mode-2 traffic. During symbol durations $t_{i+10}$, $t_{i+11}$, the entire OFDM band 50 is dedicated to Mode-2 traffic. Finally, during symbol duration $t_{i+10}$ and onward, the first frequency band 51 is assigned to Mode-2 traffic while the second frequency band 53 is assigned to Mode-1 traffic. It is noted that it is only because the frequency bands in this example are equal to each other that the size of the first and second bands 51,53 does not change over time. For example, if 10 sub-carriers were assigned to Mode-1 traffic and 22 sub-carriers were assigned to Mode-2 traffic, then when the Mode-1 traffic and Mode-2 traffic switch places, the demarcation point 55 in frequency between the two bands would move.

In the illustrated example, the division of the OFDM band 50 between frequency bands 51,53 is equal, with 16 sub-carriers per band. In one embodiment, the time-frequency resource allocation 100 shown by example in FIG. 2 for Mode-1 and Mode-2 can be the same across a wireless network, with the same assignment occurring in multiple cells. In another embodiment, the time-frequency resource allocation (provided for Mode-1 and Mode-2) can vary from cell to cell, and from time to time. For example, a network manager or an individual base-station can dynamically reconfigure the resource allocation. In other words, the respective bandwidths assigned for Mode-1 and Mode-2 are not constrained to be equal. In some embodiments, the partitioning of the OFDM band 50 into frequency bands 51,53 is a static one. In another embodiment, the partitioning of the OFDM band 50 between frequency bands 51,53 is based on the traffic load balance between Mode-1 and Mode-2 within a cell of a wireless network. Furthermore, while only two frequency bands are shown in the illustrated example, it is noted that for both Mode-1 and Mode-2 traffic there may be a further division of the frequency band to define multiple channels. Sub-bands of the Mode-1 and Mode-2 assigned bands are used by different users to transmit simultaneously.

Frequency hopping of Mode-1 and Mode-2 within the OFDM band is intended to help combat deep fades in both the time and frequency dimensions, as well to allow for further adaptive channel resource allocation of the Mode-1 and Mode-2 based on the traffic loading and overall channel conditions.

Moreover, frequency hopping Mode-1 and Mode-2 reduces the need for the identical Mode-1 and Mode-2 partitioning across a wireless network and over time within a single cell. As a result, either Mode-1 or Mode-2 transmission can be dominant (i.e. assigned more bandwidth) in different areas of the wireless network as determined by UE traffic distribution. In fact, one of or both of the two OFDMA modes Mode-1 and Mode-2 may not be present in all areas of the wireless network at a given instant. However, it is preferable that Mode-1 always be present in the wireless network because it more readily supports low rate signalling channels used to maintain wireless network operation.

For both Mode-1 and Mode-2 operation, during a given symbol duration, simultaneous (but not necessarily synchronous) transmissions from different UE's are mapped into one or both of the frequency bands 51,53 based on each particular UE's mode of operation for that period and a mapping pattern for that period.

Once the frequency band and mode of operation is assigned to a given user, many different approaches to actually mapping data to the band may be employed. In an embodiment of the invention, the mapping pattern defines a respective set of Space-Time Coded Sub-Blocks (STC-SB) in the time-frequency dimension. An STC-SB is a mapping of data to a wireless channel that has both a time and a frequency dimensions. That is to say, a single STC-SB spans multiple sub-carriers and multiple symbol durations.

Figure 1:
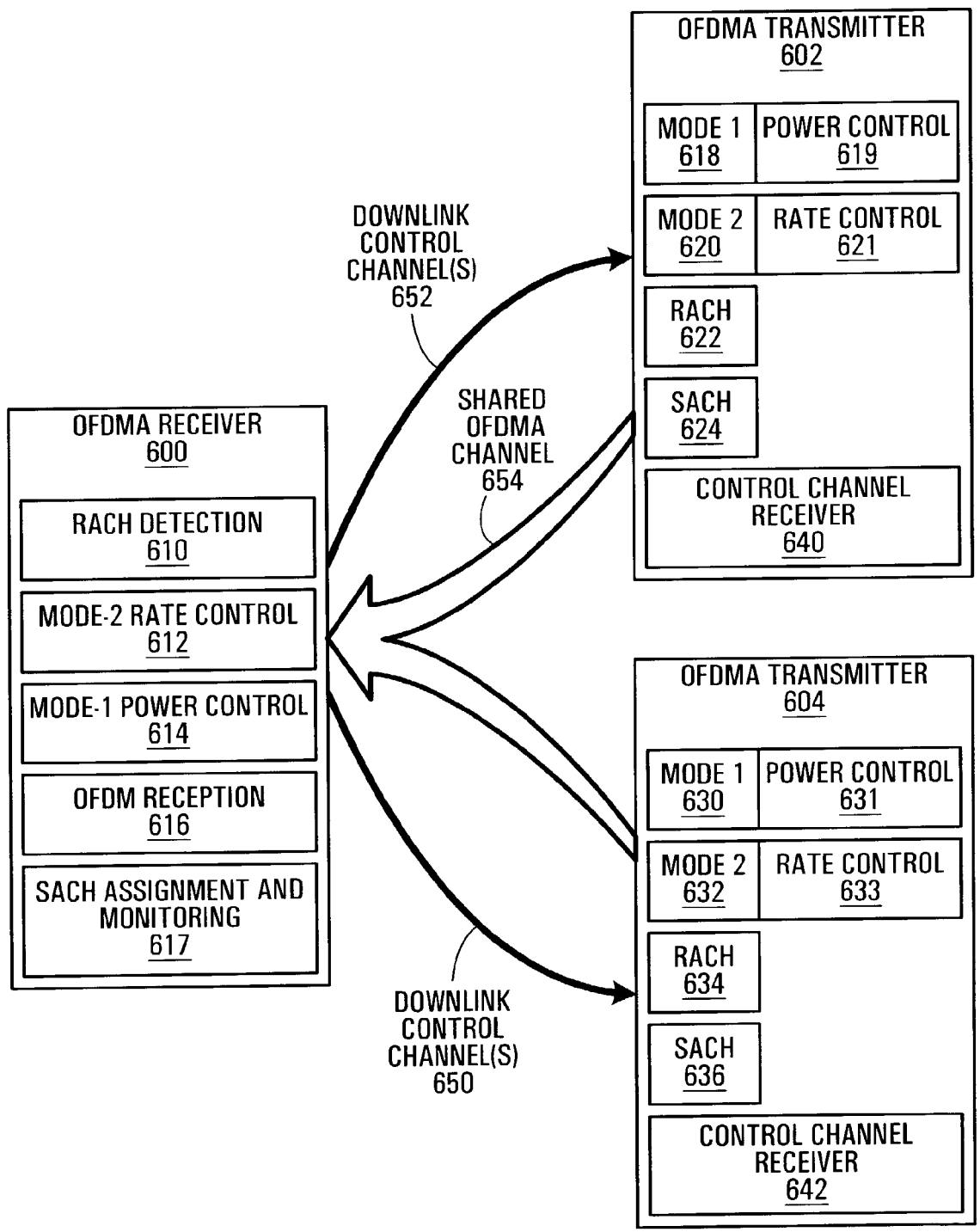
FIG. 1 is a system diagram of an OFDMA system provided by an embodiment of the invention.

An example of a single STC-SB 80 is shown in FIG. 1. An STC-SB includes a limited number (10 in the illustrated example) of consecutive OFDM sub-carriers in the frequency dimension and one or more OFDM symbol durations (two in the illustrated example) in the time dimension.

In order to support coherent detection, pilot symbols are included in STC-SB's. For example, the STC-SB 80 has two pilot symbols 82 on each end of its frequency dimension that allows for interpolation in frequency across the bandwidth between the pilot symbols. The remaining sub-carriers are used for data. The maximum size of the STC-SB is typically limited by the frequency coherence bandwidth. Interpolation between pilots separated by more than the coherence bandwidth will not yield valid channel estimates. This allows for receivers to employ simple channel estimation methods.

It should be noted that the frequency coherence bandwidth will typically be smaller than the corresponding bandwidths of the frequency bands 51 and 53. Thus each frequency band 51 and 53 can advantageously be sub-divided further so that multiple STC-SB's can be transmitted into each frequency band 51 and 53 simultaneously without overlapping in the frequency domain. Accordingly, in some embodiments, the STC sub-block can be considered the smallest uplink transmission unit provided by OFDMA. The STC-SB can also be used as the time-frequency hopping unit. OFDMA lends itself to multiple-user access quite easily since there is no constraint that forces all of the STC-SB's transmitted at the same time to belong to the same UE. In the discussion which follows, the STC sub-block is assumed to be the smallest uplink transmission unit for both Mode-1 and Mode-2 operation. However, it is to be understood that other ways of mapping data for Mode-1 and Mode-2, once the respective bands are defined, can be employed.

To support uplink transmit power measurement, in some embodiments the pilots from each UE are generated from a coded sequence and are power boosted. The pilot symbol locations of the intra-cell users are preferably offset from each other either in the frequency direction or in the time direction. With this pilot channel implementation a preamble is not required.

Within frequency band 50 of FIG. 2, mapping is done such that STC-SB's from different UE's do not overlap in time or in frequency within the same cell/sector for both Mode-1 and Mode-2 operation. This has the effect of significantly reducing intra-cell interference. Moreover, in some embodiments, orthogonal mapping patterns are employed for each user that also provide time-frequency diversity. A discussion detailing orthogonal hopping (mapping) patterns that can be used for Mode-1 or Mode-2 transmissions are provided further below in relation to the details of Mode-1. Orthogonal hopping patterns that reduce both intra-cell interference and inter-cell interference are described.

Cell Specific Covering Codes

In some embodiments, a cell-specific covering code is applied to the transmissions from all UE's within a particular cell before STC-SB mapping (hopping) is carried out. If cell-specific spreading codes are employed across an entire wireless network, the result is that every cell can use the same set of Walsh codes. As note above, orthogonal hopping (mapping) patterns are also used for this purpose and will be discussed further below.

The advantages of the frequency domain spreading are the interference mitigation in the frequency domain and the simple implementation of an optimum/sub-optimum MAP (Maximum a posteriori probability) receiver and/or multiple-user detection in frequency domain which significantly increases performance.

MIMO Operation Mode

OFDMA can be employed using various antenna configurations. The simplest embodiment is for each UE to have one antenna and each base station to have one antenna (per sector if sectorized). In another embodiment, a SIMO (single input, multiple output) scheme is employed having a single transmit antenna and multiple receive antennas. In another embodiment, a MIMO (multiple input, multiple output) scheme is employed which features multiple transmit antennas and multiple receive antennas. In another embodiment, a MISO (multiple input, single output) configuration is employed. In another embodiment, the antenna configuration employed for Mode-1 and Mode-2 transmissions is different. For example, to save power an UE can apply SIMO for Mode-1 and apply MIMO for Mode-2.

To support the two antenna MIMO transmission an STC-SB should include at least two OFDM consecutive symbols in the time domain. More generally, for an N×N system, there should be at least N OFDM consecutive symbols in the STC-SB. The number of consecutive OFDM sub-carriers in an STC-SB can again be determined by the frequency coherence bandwidth of the common wireless channel Transmission Modes As indicated above, the uplink transmission is classified into two modes. Mode-1 supports the provision of user dedicated channels with fixed data rate to support real-time service, uplink signalling and simple messaging. Mode-2 supports the transmission of high speed data bursts. The partition of the time-frequency resource between these two modes is preferably based on the traffic load balance between the two modes in the radio network.

Mode-1 Description

As discussed above, Mode-1 operation occurs within a frequency band of the overall OFDM band. The following discussion deals with the operation of the Mode-1 band as it is assigned at a given instant. As indicated previously, this band may be statically or dynamically assigned with fixed or variable size.

Mode-1 according to an embodiment of the invention is designed to support several simultaneously transmitted (parallel) transport channels per user. One or more of these simultaneously transmitted parallel transport channels can be assigned per active UE depending on bandwidth requirements. These transport channels may have corresponding data rates to support real-time services (such as voice), uplink signalling and simple messaging. In some embodiments, the corresponding data rates are maintained through the use of power control and adaptive modulation.

More specifically, Mode-1 operates in an open or closed power control loop to provide parallel transport channels per UE that carry fixed rate circuitry data, low delay circuitry data or high-speed packet data.

On a per UE basis, Mode-1 signals include one or more orthogonal spreading codes that are used to separate the transport channels belonging to a single UE. Accordingly, the modulation technique for Mode-1 can be termed "Multi-Code (MC)-OFDMA". The orthogonality of the code-separated transport channels is guaranteed through the wireless channel because a single UE is able to transmit the code-separated transport channels synchronously.

Multi-Code-OFDMA (MC-OFDMA) introduces a code multiplexing on top of the "frequency and time divisions" created by the OFDMA.

The multiple parallel transport channels may be signalling channels required for network maintenance or they may be voice channels that require real-time service. Examples of the various signalling channels that can be included in an uplink are provided further below.

Figure 3:
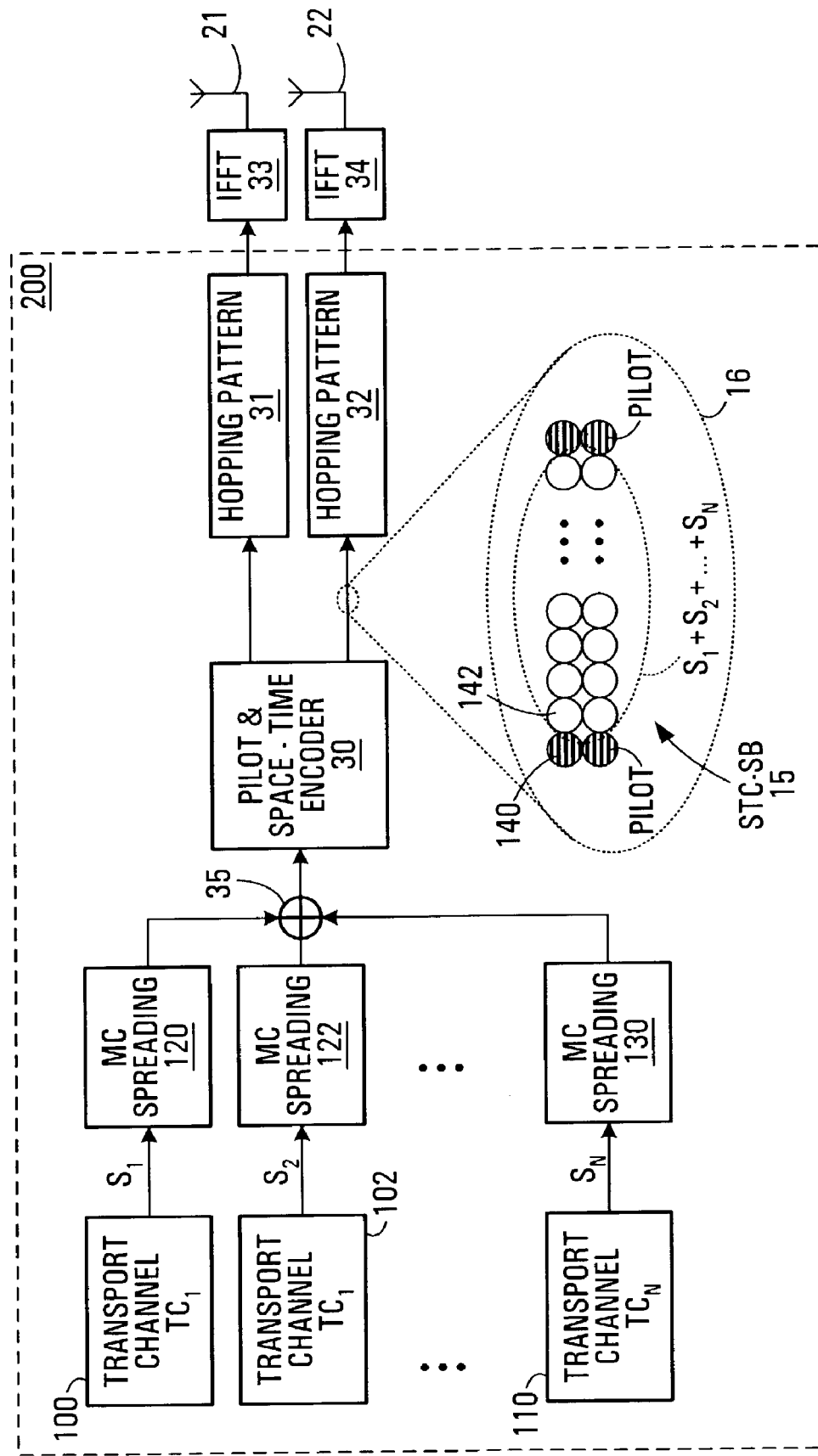
FIG. 3 is a block diagram of a transmission signal chain that can be used to generate a Mode-1 uplink signal according to an embodiment of the invention.

With reference to FIG. 3, shown is a schematic diagram of a transmission signal chain 200 that can be used to generate a Mode-1 uplink signal for a single UE. It should be understood that the transmission signal chain 200 may be implemented using a combination of hardware, software and firmware adapted accordingly.

The transmission signal chain 200 includes multiple parallel transport channels $TC_1$ 100, $TC_2$ 102, . . . , $TC_N$ 110. The number of channels is dictated by system design and bandwidth considerations. At a minimum, a user wanting to operate in Mode-1 will need at least one such transport channel. Each transport channel $TC_1$ 100, $TC_2$ 102, . . . , $TC_N$ 110 is coupled in series to a respective orthogonal code spreading function 120,122, . . . ,130. The output of each of the spreading functions 120,122,130 is coupled into an adder 35 which adds together the sequences thus spread. The output of the adder 35 is coupled into a Pilot and Space-Time (ST) Encoder 30, which provides two parallel outputs to Hopping Pattern Generators (HPG) 31 and 32 respectively. The hopping patterns are the same for the two antennas. The HPG's 31 and 32 are respectively coupled to IFFT (inverse fast Fourier transform) functions 33,34 having outputs which are connected to corresponding antennas 21 and 22. Embodiments without hopping would omit the HPGs 31,32.

In operation each transport channel 100,102, . . . ,110 delivers modulated data symbols to the respective orthogonal code spreading function 120,122, . . . ,130 one at a time. For example, as shown in FIG. 3 at a given instant, transport channels 100,102, . . . ,110 are shown providing respective symbols $S_1, S_2, \ldots, S_N$ to the corresponding orthogonal code spreading function 120,122, . . . ,130. The modulation used to modulate each modulated data symbol can be for example, QAM, 16 QAM or 64 QAM. Moreover, there is no requirement for the transport channels to use the same symbol modulation technique.

Each orthogonal spreading function 120,122, . . . ,130 multiplies each symbol received from the transport channel by multiple chips of a respective orthogonal code. In a preferred embodiment, the orthogonal codes are Walsh codes of length L=16 such that each transport channel results in sixteen chips after spreading. It is to be understood that other size Walsh codes, and other types of orthogonal codes can be employed.

The corresponding chips from each orthogonal code spreader are added together with adder 35. The output of adder 35 is a sequence of L chips, each of which contains information for each of the transport channels. The output of the adder 35 is provided to the Pilot and ST-Encoder 30. For embodiments with multiple transmit antennas, the Pilot and ST encoder 30 has two roles. To begin, for a two antenna system (or N antenna system), it processes the sequence of chips to generate two (N) sequences of chips, one for transmission on each antenna during two (N) symbol durations. In one embodiment, this processing is STBC. It is to be understood other mechanisms of generating two (N) sequences can be employed. See for example S. M. Alamouti, "A Simple Transmit Diversity Technique for Wireless Communications", *IEEE J. Select. Areas Commun.*, vol. 16, no. 8, pp. 1451-1458, October 1998, and V. Tarokh, H. Jafarkhani, and A. R. Calderbank, "Space-time Block Codes from Orthogonal Designs", *IEEE Trans. Inform. Theory*, July 1999. For example, the 16 chip signal can be processed by the space time encoder to generate two 8×2 STC sub-blocks, one for each antenna. The other function is to generate and append UE specific pilot symbols on either side of STC-SB generated from the L composite chips. This results in a 10×2 block for each antenna illustrated generally at 16 with pilot symbols 140 and STC symbols 142. For each antenna, this is passed on to respective HPG 31,32. The HPGs 31,32 determine which sub-band of the Mode-1 FFT bandwidth is to be used for the particular transmission, and the IFFT functions 33,34 perform the frequency-to-time conversion.

At any given instant the HPG's 31 and 32 map the STC-SB's that they receive to the sub-band of the Mode-1 OFDM band currently being used for Mode-1 transmissions. For Mode-1 transmissions, the hopping patterns are unique to a single UE within a cell/sector and may be pseudo-random.

The mapping of each user is preferably spread over the time-frequency dimension by using random hopping pattern to achieve time-frequency diversity. The hopping unit is preferably the STC sub-block. The hopping patterns are discussed in greater detail further below.

A MC-OFDMA user mapping design is provided which is optimized for both high speed mobility and nomadic deployment scenarios. The sub-band mapping is dictated by the channel propagation characteristics.

Figure 4:
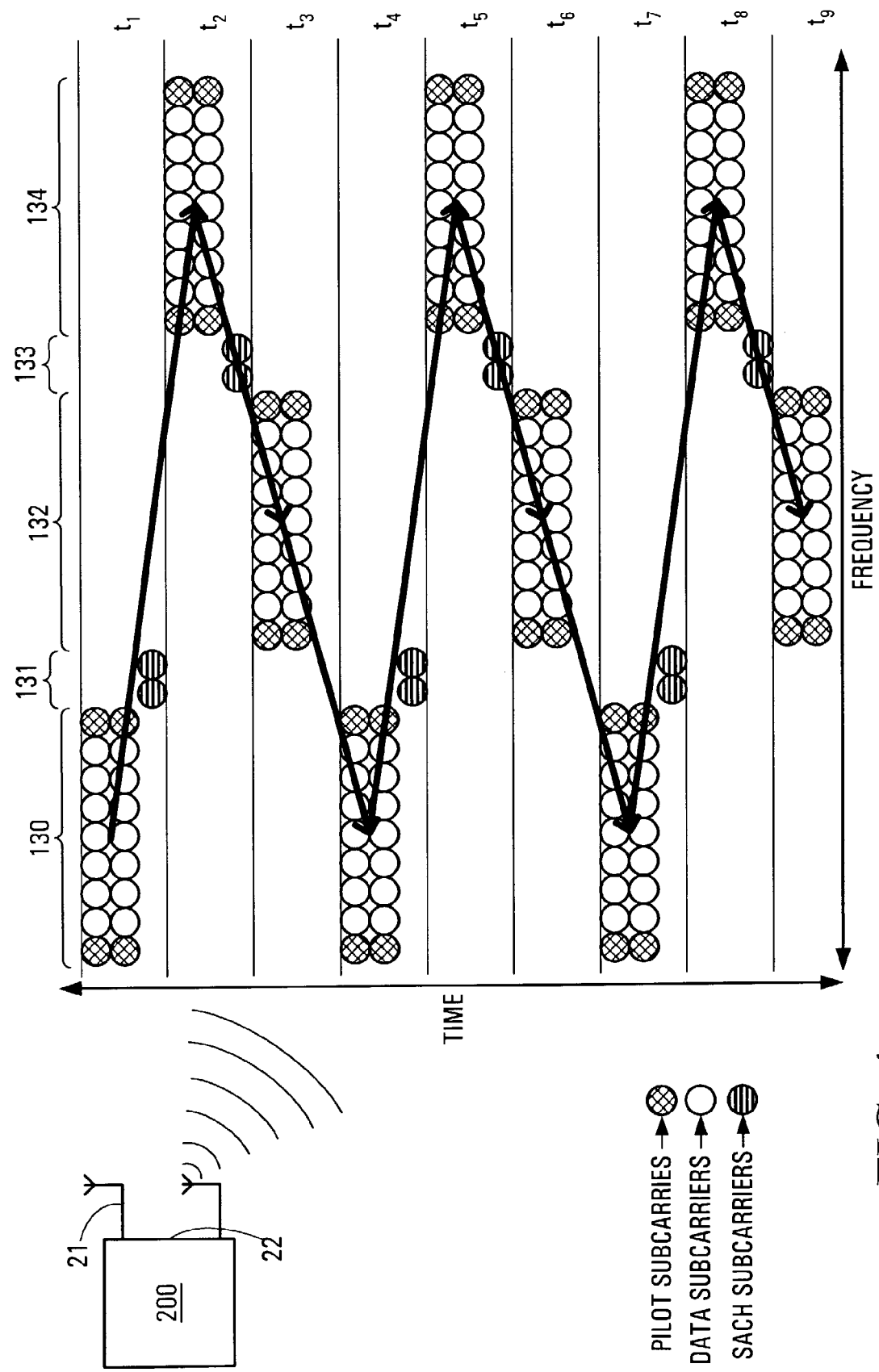
FIG. 4 is an example time-frequency diagram for a single user's Mode-1 transmissions.

FIG. 4 provides an example illustration of the transmission in time and frequency of a user's Mode-1 signal. Again, the horizontal axis represents frequency and the vertical axis represents time. In this example, the Mode-1 frequency band is divided into three sub-bands, and each of the three sub-bands is sized to carry an STC sub-block in the form of sub-block 16 of FIG. 3. The Mode-1 band also includes SACH sub-carriers 131,133 in this example. These are described further below. It can be seen that during each symbol duration, the user is transmitting on one of the three sub-bands, and that the sub-band used hops around. Thus, during the symbol durations $t_1, \ldots, t_9$ shown the user transmits an STC sub-block on each of sub-bands 130,134,132, 130,135,132,130,134,132 in sequence.

Each of the sub-bands defines a channel for Mode-1 transmission. Preferably, no two users in a sector are assigned the same channel at the same time. Thus, in the example of FIG. 4, in the time and frequency positions not occupied by the user's Mode-1 transmission, other users' Mode-1 transmissions are transmitted. In this manner, users are separated in frequency within a cell. In another embodiment, if very good synchronization can be achieved between users, then users can be assigned overlapping bands, so long as they use different orthogonal spreading codes.

Such a MC-OFDMA based Mode-1 uplink can support low delay and fixed data rate circuitry data such as voice, simple message and signaling as well as high-speed packet data service. In simulation, MC-OFDMA was found to have a spectral efficiency 5-10 times higher than a 3G wireless system employing CDMA. Additionally, the simulated MC-OFDMA system was also found to provide an increase in system capacity and uplink data rates that were each an order of magnitude greater than the 3G wireless system employing CDMA. These results do not mean every implementation would be as effective.

The transport channels of FIG. 3 preferably include channel coding (not shown). The channel coding block span preferably covers several hops for one user to achieve diversity gain and inter-cell interference averaging.

Figure 5:
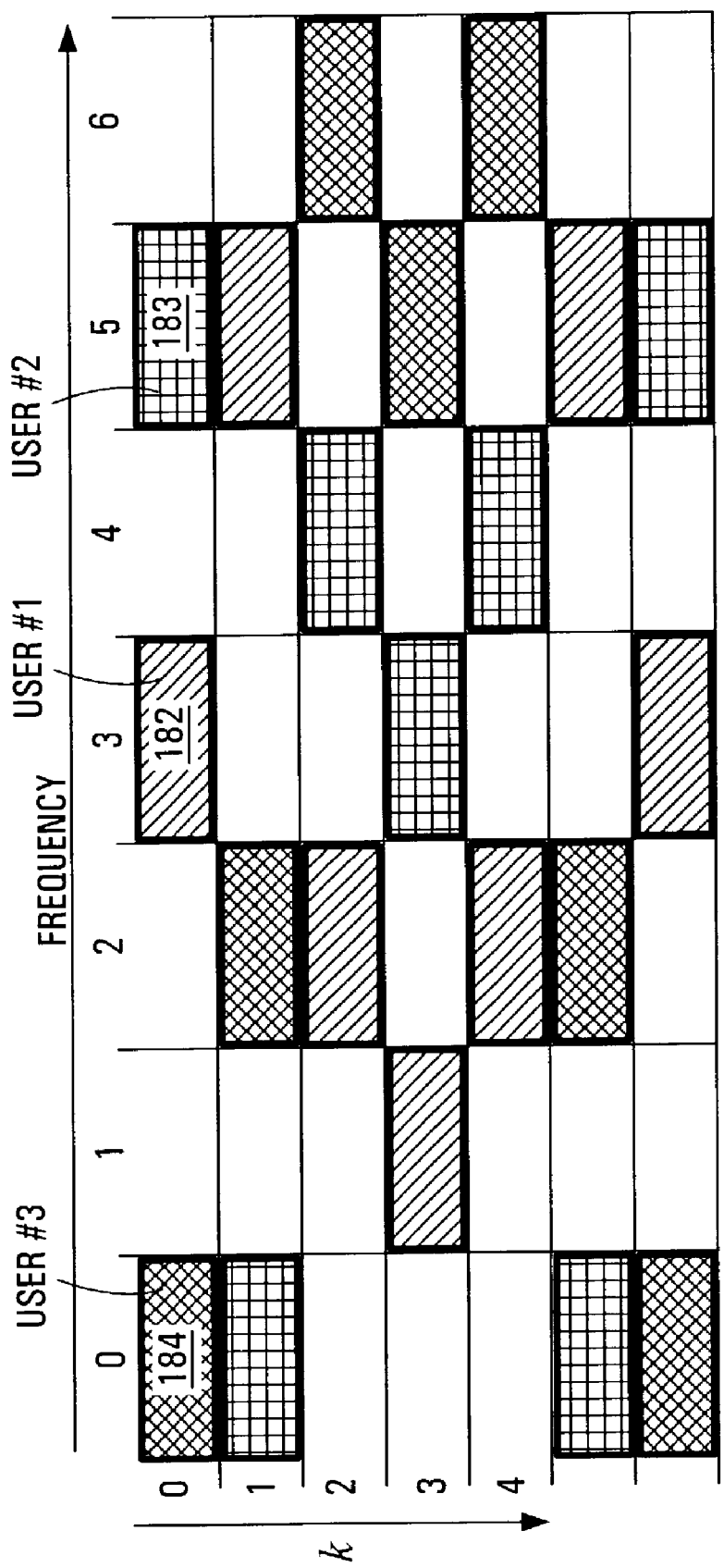
FIG. 5 is an example time-frequency diagram for multiple users' Mode-1 transmissions.

FIG. 5 is another example of how the Mode-1 band might be occupied. This example shows time on the vertical axis, and STC sub-blocks on the horizontal axis. The STC sub-blocks assigned for user one are generally indicated by 182, for user two at 183 and for user three at 184. In this case, the three users are given the same transmission rate R, and as such the distribution of the STC sub-blocks for these three users assigns the same number of sub-blocks per user. It is noted that the particular hopping pattern was generated using the below discussed synchronous quadratic congruence codes.

In MC-OFDMA system, the code division is used for the concurrent transmission of the data of a single UE on the same STC sub-block. Because each STC sub-block is exclusively assigned to a single user in a sector, there is no inter-user interference in each STC sub-block, however, due to the loss of orthogonality caused by the fading channel, intra-user self-interference (inter-code interference) exists. MC-OFDMA can appropriately take the advantage of orthogonal spreading codes in the UPLINK to reduce the self-interference, due to the exact synchronous nature of the orthogonal codes, the MC-OFDMA system also enables low complexity channel estimation and simple linear multi-code channel detection, because all the Walsh channels transmit through the same propagation channel.

Adaptive SF MC-OFDMA

The spreading factor on each of the transport channels may be variable and is preferably set according to the traffic load and the channel conditions. After being spread, one symbol is represented by K symbols. This number of K is defined as "spreading factor". Note that K symbols will take K sub-carriers in an OFDM system. The change of the spreading factor is realized by changing the mapping of STC sub-block units covered by the spreading code.

Thus, in some embodiments, the spreading factor is controlled by the base stations's scheduler depending on the channel condition and the traffic loading for a specific UE. The base station can assign more than one Walsh channels to the circuitry data channel that needs higher protection or higher data rate. For Mode-1, the signal is power controlled, i.e., the data load that can be carried by each Walsh channel is fixed. Therefore, the more Walsh channels that are assigned to one particular user, the higher is the data rate. In addition, a lower code rate used by a given user will result in better protection.

Figure 6A:
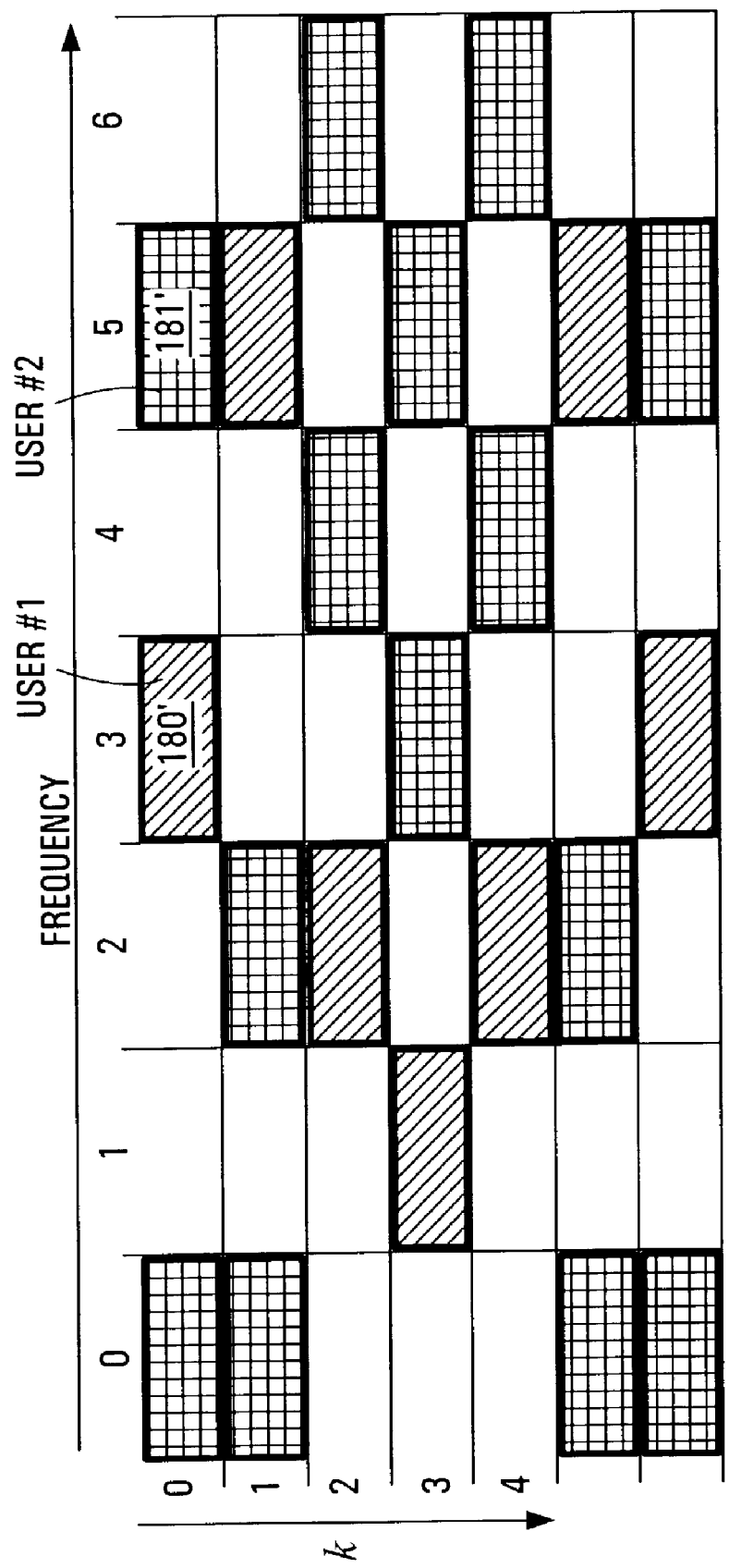
FIGS. 6A and 6B are further examples of time-frequency diagrams for multiple users' Mode-1 transmissions.

Two further examples of how Mode-1 bandwidth can be assigned will now be described with reference to FIGS. 6A and 6B. FIG. 6A shows how hopping might occur for a system in which there are two users, with a first user, user #1 being assigned a rate R, and a second user, user #2 being assigned a rate 2R. This means that there will need to be twice as many STC sub-blocks assigned to the second user as are assigned to the first user. The sub-blocks assigned to user #1 are generally indicated at 180 and the sub-blocks assigned to user #2 are generally indicated at 181. It can be seen that there are twice as many sub-blocks assigned to user #2 as there are to user #1.

Figure 6B:
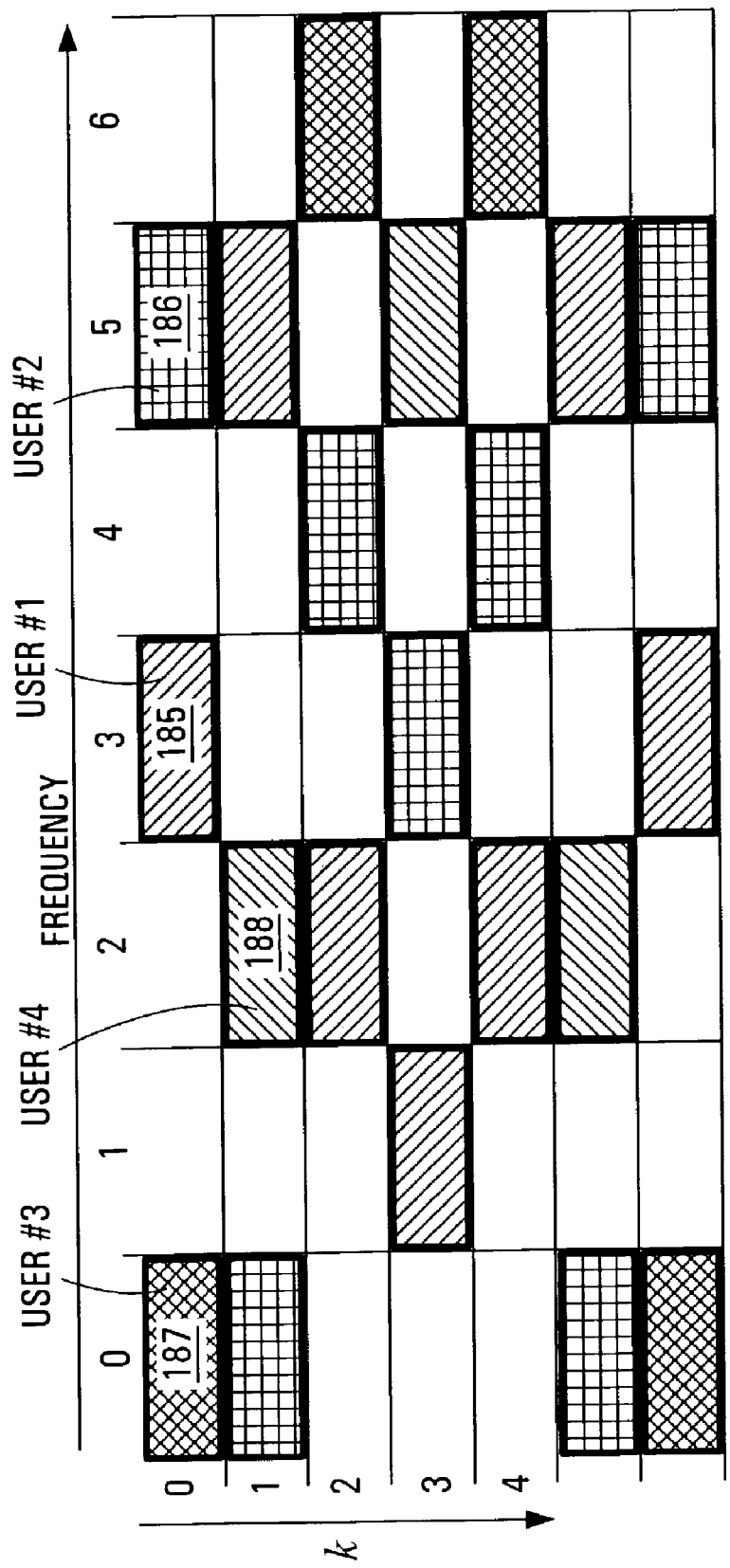

In another example, shown in FIG. 6B, there are four users with user #1 assigned a rate R, user #2 assigned a rate R, user #3 assigned a rate R/2, and user #4 assigned a rate R/2. This sub-blocks assigned to user #1 are generally indicated at 185, for user #2 186, for user #3 187 and for user #4 188. It can be seen that users #1 and #2 are assigned twice as many blocks as users #3 and #4. Every STC transmission period includes one sub-block for each of users #1 and #2 whereas only every second STC transmission period includes a sub-block for each of users #3 and #4.

Power Controlled MC-OFDMA

Mode-1 operation is used for the transmission of the slow traffic channel. In some embodiments, the same band is used for the RACH as detailed below. In some embodiments, the slow traffic channel applies open-loop power controlled MC-OFDMA technology. An example power control solution is presented below with the description of the RACH.

System Access Channel (SACH)

In some embodiments, a system access channel is provided for use as a quick UPLINK paging channel to signal the base station for the MAC state transition both at the base station and UE. A UE which has accessed the system, or i.e. is in a power on state, in standby state is not transmitting in either of Mode-1 or Mode-2. Preferably, the SACH signaling has two states, namely active and non-active. The SACH signal is transmitted periodically from all non-active UEs to allow the base station to track the UE timing and maintain the synchronization during the UE non-active mode.

In one embodiment, the SACH for a given user is two or more sub-carriers allocated during certain periodic OFDM symbols. Preferably, one of the sub-carriers is encoded with pilot channel, and the remaining sub-carriers contain differentially encoded access requests including at least one state which would indicate that the user is requesting Mode-1 and/or Mode-2 capacity to be scheduled. Only users in a standby state are allocated a SACH channel. Once the user goes active, the SACH is deallocated and becomes available for allocation to another user. The base station monitors all of the SACH channels, performs scheduling accordingly, and during standby is able to maintain timing and synchronization.

In the example of FIG. 4, two SACH channels 131,133 are shown. Each SACH 131,133 occupies a pair of adjacent sub-carriers every fourth OFDM symbol period. Sub-carriers allocated for SACH channels can be in the frequency direction as shown in FIG. 4 or in the time direction.

Preferably, as in the example of FIG. 4, SACH sub-carriers are allocated in such a manner that they do not overlap with Mode-1 transmissions of any users in the cell. Once a plurality of SACH channels are defined, these can be assigned to UEs in the cell using a paging channel for example. If there is no downlink traffic for an active UE and also no uplink transmission request from that UE for some period of time, typically the base station will then turn off for the dedicated uplink channel for that UE and at the same time assign it a SACH channel. The UE then transits from the active state to the standby state according to the signalling received from the base station. The UE then uses its dedicated SACH to inform the base station if it wants to initiate an uplink transmission. Eventually, the base station will inform the UE to transit from standby state to idle state if the UE keeps silent for some period of time. Once the user in idle state, the user will need to use the below-described RACH to get access to the uplink system again.

Uplink Signalling Channels

Preferably, a set of parallel low delay circuitry data signalling channels to support the network operation are provided in the Mode-1 transmission. The definition of these signalling channel are as follows:

1) DL channel condition (CQI/CLI) feedback—A short block coded down link channel quality indicator and MIMO channel indicator for the base station to perform multi-user scheduling and adaptive coding modulation and MIMO Mode adaptation. Preferably, two data rates are defined for this channel, high data rate for fast adaptation and low data rate for slow adaptation.

2) DL ACK/NAK signalling—Spread signalling for indicating the acknowledgement of the successful/failure reception of the down link packet.

3) Uplink buffer status (buffer full)—A short block coded indicator on UE uplink data buffering condition to allow the base station to schedule an uplink Mode-2 data burst. Further details on Mode-2 are provided below.

4) Uplink transmit power margin—A short block coded indicator on UE uplink transmit power head room to allow the base station to schedule the uplink Mode-2 data burst.

5) Uplink rate indicator—A short block coded indicator on the Mode-1 and Mode-2 traffic data channel rate indication for base station receiver demodulation and decoding. For Mode-1, the rate indication can be used to support the UE autonomous scheduling. For Mode-2, this channel also can be used to indicate the UE MAC identification.

Uplink Traffic Channel

As indicated previously, two types of uplink traffic channel are defined as follows:

Fixed Data Rate Dedicated Traffic Channel (Mode-1)

This Mode-1 type of channel is designed for the user dedicated channels with fixed data rate to support a real-time service, typically voice. The channel can be power controlled, preferably with open loop power control applied to support the basic operation, and optionally with closed loop power control also applied.

The non-overlap assignment of the STC-sub-block among multiple UPLINK users can avoid the user intra-cell interference. It is preferable to design an orthogonal hopping pattern to assign to the different users. For example the synchronous quadratic congruence codes $y_k$=QCS(a, α, β, k, p) can be employed as follows $$y_k^{QCS} = [a(\alpha + k)^2 + \beta] \bmod p$$

k=0, ... p−1
a=1, ... ,p−1
α,β=0, ... ,p−1

Such a hopping pattern can be used for the control of intra-cell users. For the inter-cell users, the following asynchronous quadratic congruence codes can be used to control of the inter-cell user hopping:

$$y_k^{QCA} = [ak^2 + bk + c] \bmod p$$

The sporadic assignment of the time-frequency unit in an OFDM symbol to assist PAPR (Peak-to-Average Power Ratio) reduction.

For Mode-1 transmission, it is preferable to arrange the random hopping pattern such that in each STC block, for each user there is only one/several STC sub-block is/are allowed to transmit. In this case, for each user only a small fraction of sub-band is transmitted for each OFDM symbol, this allows to several PAPR reduction techniques to be employed such as the H-infinity based tone injection, method or constellation shaping method, etc, to increase the UE transmit power efficiency.

The hopping pattern of FIG. 6 was generated using this method.

Uplink Power Control

The power control of the Mode-1 traffic channel can be open-loop power control. In one embodiment power control is achieved as follows:

1. UE sends RACH (described in detail below) with the power inversely proportional to the long-term estimated DL C/I measurement and the RACH signature spreading factor (more generally, RACH power increases as estimate decreases);

2. Base station measures the power of RACH from UE and sends back the power control command to UE for increasing/ unchanging/decreasing transmit power—this power control transmission may also be construed as an acknowledgement, in the absence of acknowledgement, another access attempt is with increased power;

3. UE starts the uplink transmission with power based on power of RACH with adjustment based on power control command through the dedicated slow traffic channel;

4. Base station controls the uplink power based on the frame error rate from a particular UE.

Figure 7:
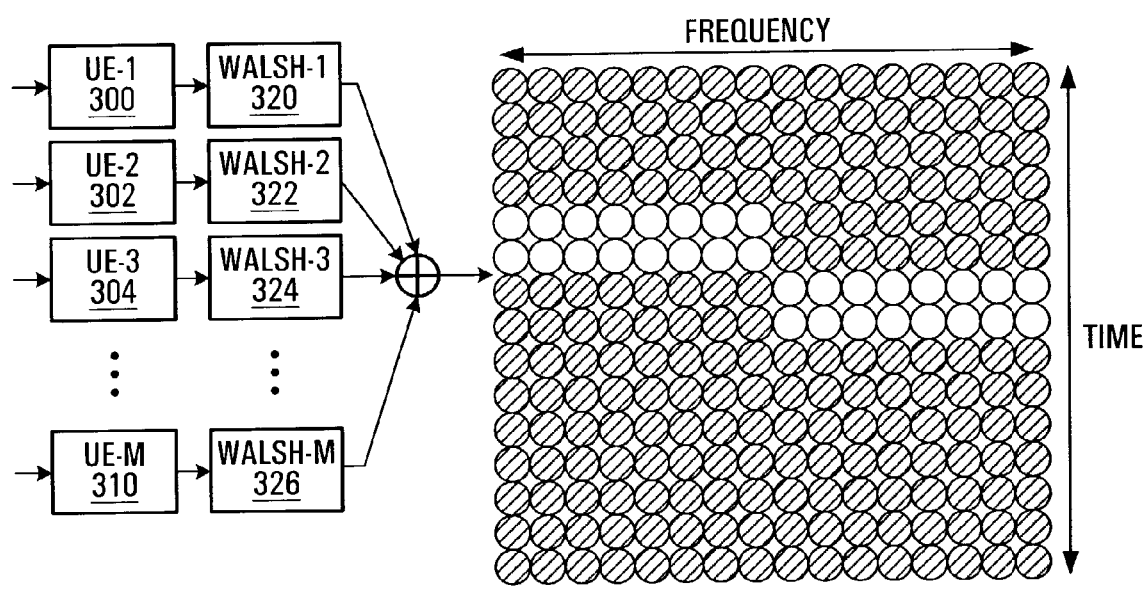
FIG. 7 is an example in which multiple users Mode-1 transmissions are separated using orthogonal Walsh codes rather than STC sub-blocks, with the spreading being done in the frequency dimension.

The above detailed description has assumed that multiple users are separated in Mode-1 using sub-blocks, and preferably with sub-block hopping. In another embodiment of the invention, if synchronization between various users in a cell can be achieved to sufficiently accurate degree, multiple users can share OFDM sub-carriers using code separation. An example of this is shown in FIG. 7 where signals for UE-1 300, UE-2 302, UE-3 304 . . . , UE-M 310 are shown spread by respective orthogonal codes, Walsh codes in the illustrated example, Walsh-1 320, Walsh-2 322, Walsh-3 324 . . . , Walsh-M 326. While a summer is shown in the diagram, this is intended to illustrate that these signals are summed over the air interface and combined additively at the receiver. In this embodiment, either the entire Mode-1 bandwidth can be shared by all users simultaneously, or multiple sub-channels can be defined as in the previous embodiment, but with each sub-channel being occupied by multiple users. With this embodiment, it is easy to see how the bandwidth allocated to individual users can be changed by giving them more or fewer Walsh codes.

Figure 8:
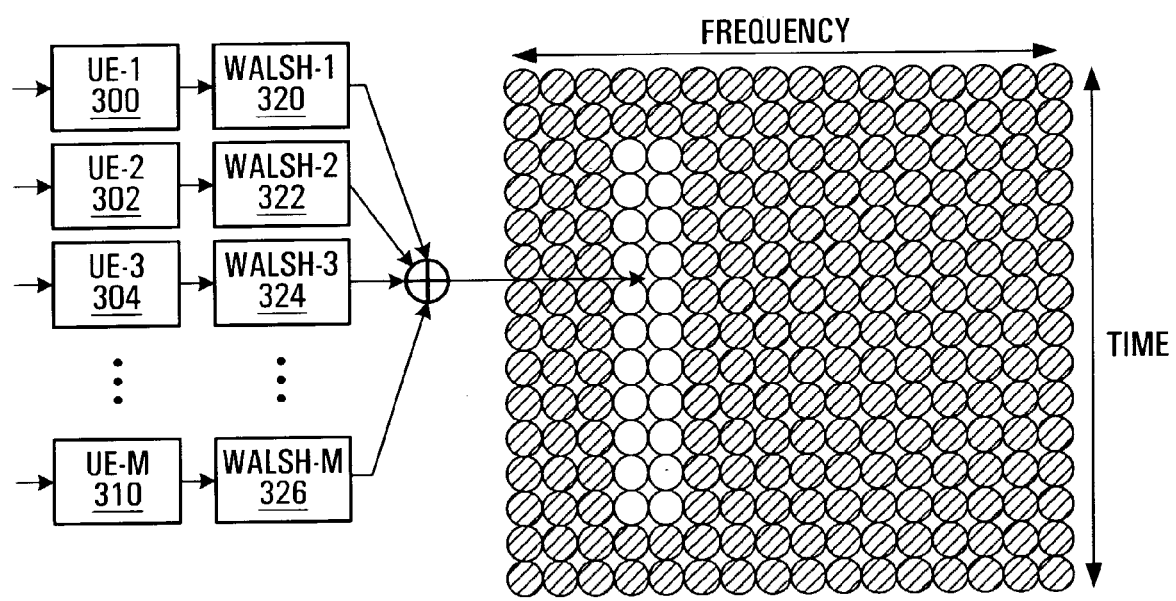
FIG. 8 is an example in which multiple users Mode-1 transmissions are separated using orthogonal Walsh codes rather than STC sub-blocks, with the spreading being done in the time dimension.

In another embodiment, in a slow-fading environment, or in the nomadic deployment scenario MC-CDMA in the time direction is a viable solution. In this arrangement, the pilots could cyclically inserted by each user, while the spacing of the pilots is sufficient to perform accurate channel estimation. In this case, a true synchronous CDMA uplink can be achieved and inter-user interference can be completely removed. An example of this is shown in FIG. 8 where the same users and Walsh code spreading of FIG. 7 is shown. However, in this case the transmission is sent out over adjacent sub-carriers for a series of consecutive OFDM symbols. Thus, the spreading is done in the time dimension instead of in the frequency dimension as was the case in FIG. 7.

Thus, during RACH transmission, the BTS generates power control commands based on the RACH and these are applied to Mode-1 traffic transmission when it starts. Then during active Mode-1 transmission, the power control commands are generated from the Mode-1 transmissions directly, for example based on FER, and are applied to the Mode-1 transmissions.

Random Access Channel (RACH)

Another embodiment of the invention provides a Random Access Channel (RACH) for UE's new to a particular wireless network to access the system. It is to be understood that other access schemes may be employed instead of RACH and/or SACH. A UE may be considered new to a particular wireless network when it is has just been turned on or has been moved into the area covered by the particular wireless network from the domain of another wireless network. In any case, a UE new to a particular wireless network must gain access to the wireless network through a base station.

Figure 9:
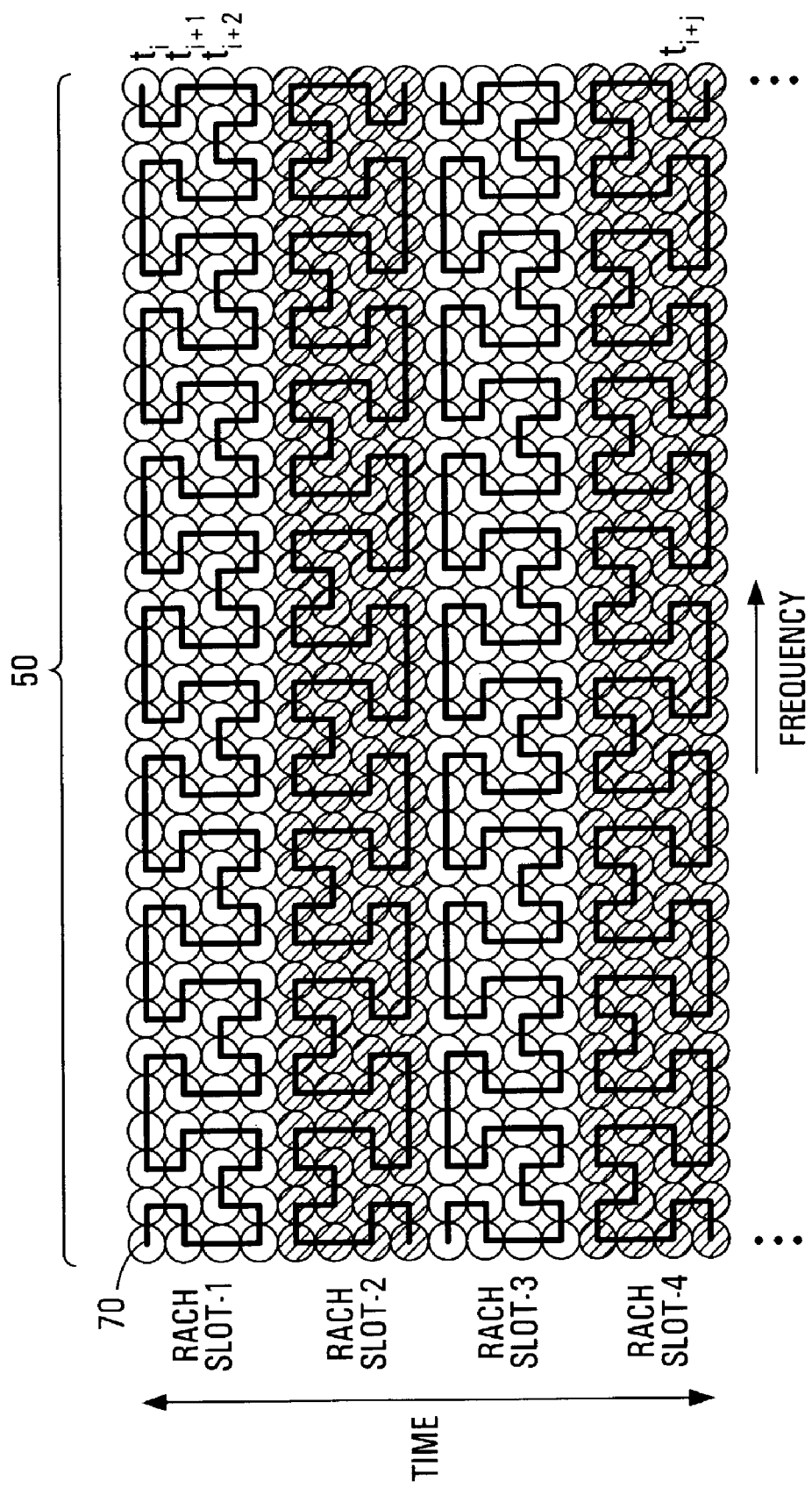
FIG. 9 is an example of how the RACH slots are defined in accordance with an embodiment of the invention.

With reference to FIG. 9, this embodiment of the invention provides a RACH that is overlaid atop the entire common wireless channel 50 or only over one of the two bands 51 and 53 shown in FIG. 1. By "overlaid" it is meant that the RACH is transmitted simultaneously both in time and frequency with the transmission of the other Mode-1 signals by other users. The RACH is thus a form of interference to the other users.

The RACH is preferably implemented using a long spreading code which is then mapped to OFDM symbols in a defined RACH slot. A RACH slot is defined as a set of OFDM symbol durations in time, preferably consecutive. In the example of FIG. 9, each RACH slot consists of four OFDM symbol durations, and four RACH slots are shown, namely RACH SLOT-1, RACH SLOT-2, RACH SLOT-3 and RACH SLOT-3.

The RACH channel structure is preferably based on PN spreading, overlaid over the MC-OFDMA. For each RACH slot, a plurality of Quasi-orthogonal PN codes define a set of RACH signatures. This allows the definition of a set of parallel orthogonal ALOHA channels during each slot. Due to the fact that non-coherent detection is employed for the RACH channel, and the UE peak power limitation, in order to support a wider coverage, the spreading factor is preferably very large, for example, in the range of $2^{10}$ to $2^{14}$ spreading. With such a processing gain, the power of RACH signature is transmitted at a very low relative power level: e.g., −16 dB, this constitutes a very weak interference to the traffic and signalling channels.

In some embodiments, the accessing UE transmits on the RACH channel as described above. In addition, preferably a power ramping procedure is applied, and therefore the RACH channel is transmitted with minimized power to reduce the inter-channel interference to Mode-1 traffic and signaling channels. More specifically, an initial attempt is made with a very low power. The absence of power control commands from the base station is construed as a failed attempt and the next attempt is made with a slightly increased power.

The RACH channel is mapped into resources:

a) RACH signature specific paralleled ALOHA channels;

b) Time-frequency dimension RACH slot, the RACH slot being different than the STC sub-block unit.

The number of allowed paralleled ALOHA channels may be dynamically configured by the network, based on the traffic loading conditions or the number of active users. An accessing UE randomly selects a RACH signature based on the slotted ALOHA protocol. The RACH signatures can be also re-used by the non-adjacent base stations.

The RACH channel structure in this example consists of the RACH slots, each RACH slots consisting of 4 OFDM symbols, with 15 RACH slots in a 10 ms frame. For each RACH slot, there are 16 RACH signatures available to construct 16 concurrent RACH access attempts in one RACH slot. In some embodiments, the mapping of RACH signature onto OFDM sub-carriers is based on the Peano-Hilbert plane filling curve to gain a better time-frequency diversity for the RACH signature, as shown in FIG. 9. A Golay sequence can be used as RACH signature for a lower peak-to-average power ratio (PAPR).

To provide reliable and flexible random access channel to multiple users, the RACH is preferably overlaid on the Mode-1 transmission bandwidth. A dedicated long complex PN/Golay code set is reserved for RACH of each base station. The base station may determine the active RACH PN/Golay code length according to the total UPLINK traffic, or this length can be statically defined. The base station can broadcast this information through a DL signaling channel.

Figure 10A:
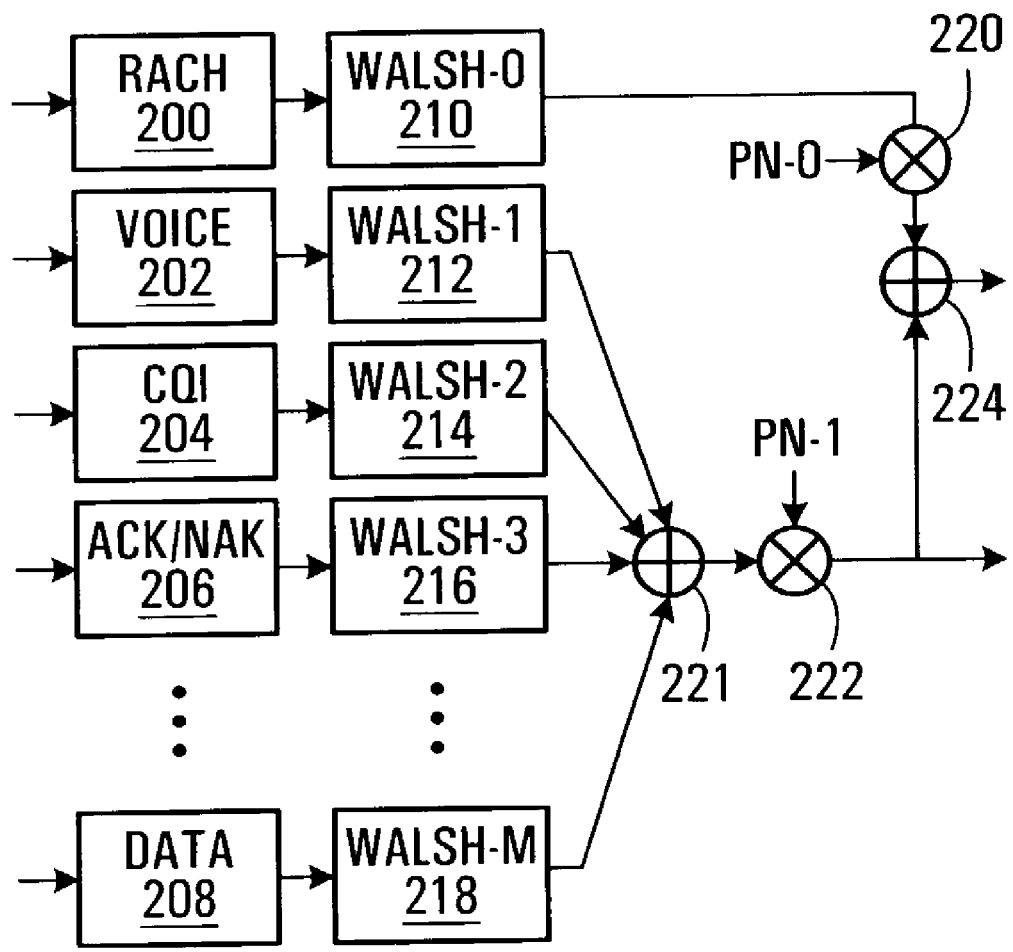
FIG. 10A is a block diagram of a transmitter showing both RACH and Mode-1 channels combined in Mode-1 frequency space.

FIG. 10A shows an example multiplexing scheme to generate the RACH and Mode-1 traffic channel. Shown are the RACH channel 200 spread by Walsh-0 210 and covered by a first long code PN-0 with multiplier 220. Also shown are Mode-1 channels voice 202, CQI 204, ACK/NAK, and data 208 spread by Walsh-1, Walsh-2, Walsh-3 and Walsh-M respectively (additional and/or different channels may be employed). The Mode-1 channels are combined with adder 221 and covered by long code PN-1 with multiplier 222. Adder 224 combines the RACH and Mode-1 signals. In the event the RACH is only used for access, then the RACH and Mode-1 signals would be mutually exclusive.

The PN covering of the Mode-1 traffic channel for one UE could be the part of the long PN covering code. The covering PN code for each base station is different from those of the neighboring base stations so that the interferences from these base stations can be averaged and whitened. Because RACH PN code is much longer than the spread code for MC-OFDMA, the transmit power of RACH can be much lower than that of slow traffic channel. The RACH should be transmitted with the power as low as possible to reduce its impact to slow traffic channel.

The detection of the RACH channel at the base station may be performed for example based on a successive interference cancellation approach. Other approaches may be employed.

In some embodiments, the RACH is also used for initial timing and synchronization. After randomly selecting one of the RACH signatures, an accessing UE transmits using the whole available access band—this preferably includes all Mode-1 sub-carriers. The base station looks for these access attempts, and simultaneously performs timing and synchronization to determine a timing offset for the UE which tells the user when the start of its OFDM symbol transmission should be such that all UE's transmissions will share a more or less common OFDM symbol boundary at the base station. The offsets may be different due to different distances from the base station.

Figure 11:
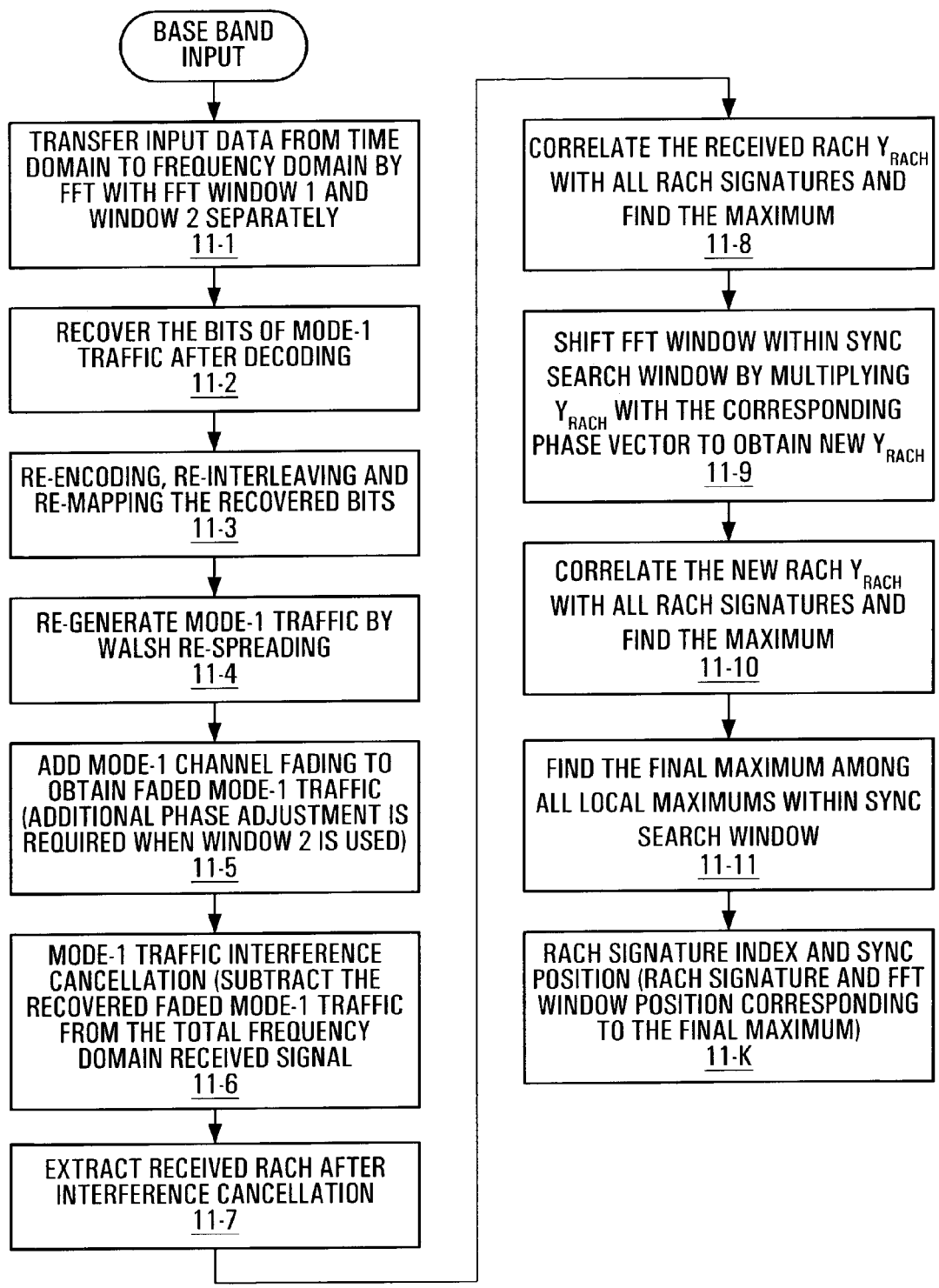
FIG. 11 is a flowchart of a method of joint RACH detection and uplink synchronization.

A detailed approach to a joint RACH detection is summarized in the flowchart of FIG. 11. The steps are as follows:

Step 11-1: Transfer input data from time domain to frequency domain by FFT with FFT window 1 and window 2 separately;

Step 11-2: Recover the bits of Mode-1 traffic after decoding;

Step 11-3: Re-encoding, re-interleaving and re-mapping the recovered bits;

Step 11-4: Re-generate Mode-1 traffic by Walsh re-spreading;

Step 11-5: Add Mode-1 channel fading to obtain faded Mode-1 traffic (additional phase adjustment is required when window 2 is used);

Step 11-6: Mode-1 traffic interference cancellation (subtract the recovered faded Mode-1 traffic from the total frequency domain received signal);

Step 11-7: Extract received RACH after interference cancellation;

Step 11-8: Correlate the received RACH $Y_{RACH}$ with all RACH signatures and find the maximum;

Step 11-9: Shift FFT window within sync search window by multiplying $Y_{RACH}$ with the corresponding phase vector to obtain new $Y_{REACH}$;

Step 11-10: Correlate the new RACH $Y_{RACH}$ with all RACH signatures and find the maximum;

Step 11-11: Find the final maximum among all local maximums within sync search window.

The output of this process is the RACH signature index and sync position (RACH signature and FFT window position corresponding to the final maximum).

The Set-up of the Uplink Transmission

The following steps describe a procedure for UE to initiate a connection with access network:

1) After power on, UE synchronizes to the base station for timing and frequency and at the same time selects the serving base station, for example through the detection of a downlink preamble.

2) UE listens to a DL signaling channel for the information identifying the RACH PN codes to be used in that cell/sector.

3) UE measures the DL long term C/I.

4) UE sends RACH code chosen randomly from serving base station's code set via an ALOHA RACH channel. The transmit power is determined inversely proportional to the DL long term C/I measurement.

5) If the base station detects the RACH code successfully it measures the time offset of that UE and then sends the initial dedicated uplink access channel grant, together with the RACH code index as well as the time offset information. The UE then detects such signature to identify access grant through DL signaling channel.

6) UE adjusts its timing and sends back its ID, its CQI report information, and uplink traffic load request if it wants to start uplink data transmission, for example via an initial dedicated uplink signalling channel, one of the parallel low delay circuitry data channels discussed previously.

7) Base station schedules the uplink multi-user accesses based on the measured uplink channel condition from Mode-1 pilot, and the traffic requirements reported from different active UEs.

8) The channel resource assignment and the coding/modulation primitives for different UE are signaled via DL signaling channel.

Every time an UE needs a new uplink connection, it sends a new access request by accessing SACH. To enhance spectrum efficiency, the UE can buffer some short messages within the delay tolerance and then transmit them on its dedicated slow traffic channel using the MC-OFDMA scheme. Alternatively, each time the UE requests a new connection and a transition to active state, a common uplink link channel in the TDM operation mode can be employed for UEs to signal the base station to perform the state transition.

Figure 10B:
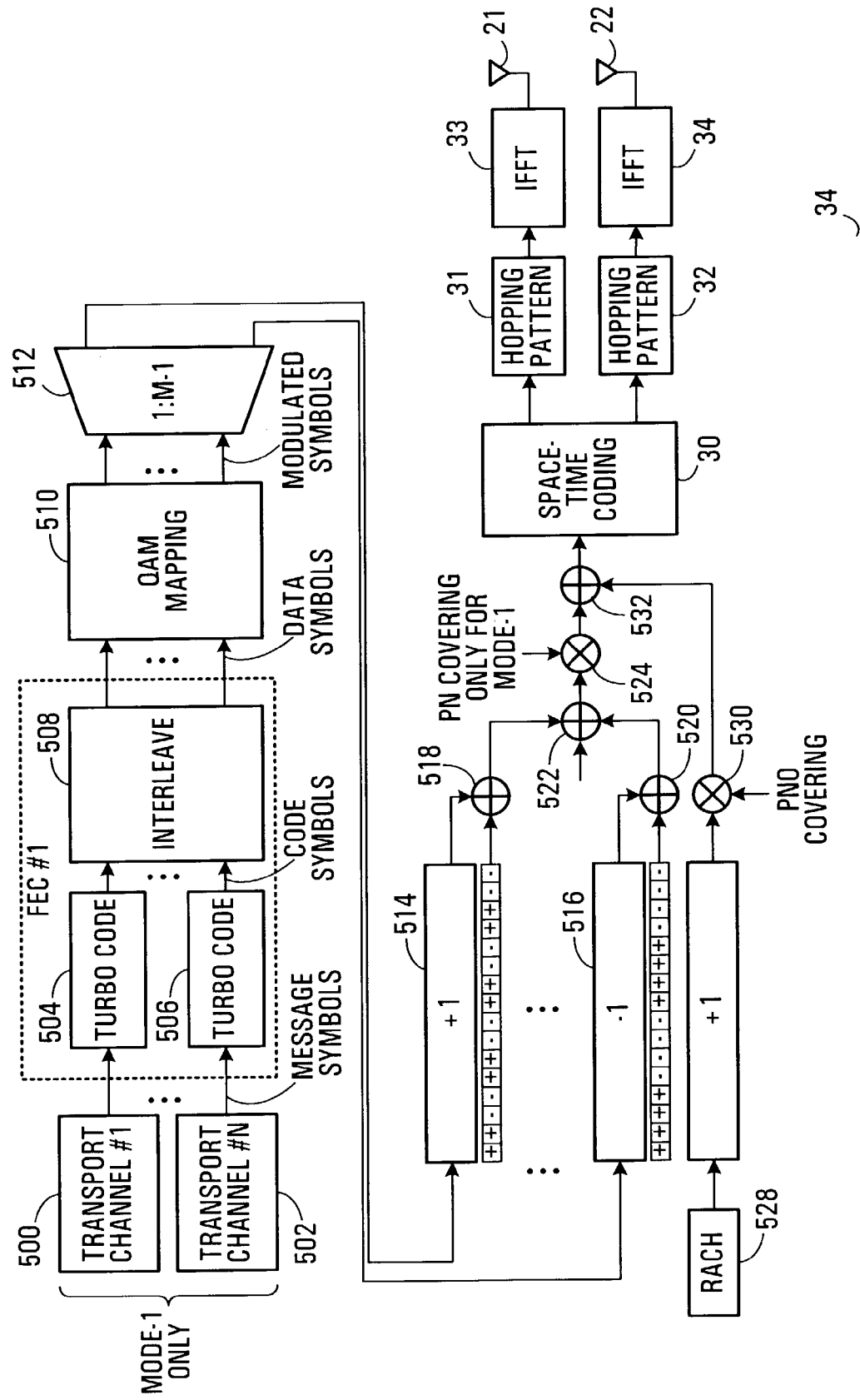
FIG. 10B is another example transmitter design similar to that of FIG. 10A but in which encoding across sub-blocks is employed.

FIG. 10B is a block diagram of another transmitter embodiment similar to that of FIG. 10A, but in which coding is performed across sub-blocks. In this example, there are N transport channels 500,502 (only two shown) each connected to a respective turbo coder 504,506 which performs channel coding. The coded outputs are fed to an interleaver block 508 which produces a parallel set of interleaved outputs which are fed to a modulator 510 which preferably performs QAM mapping. The output of the QAM mapping modulator 510 is a set of modulated symbol streams. These are all input to demultiplexer 512 which routes the modulated symbols to any one of M Walsh sequence spreading function 514,516 (only two shown). N and M are not necessarily equal. Each Walsh sequence spreader spreads a respective output of the multiplexer 512 by multiplying the data sequence by the sequence of chips of the respective Walsh sequence with adder (equivalently multiplier) 518,520. The transport channel content is collectively added with adder 522 and a first long code cover is applied at 524. The RACH channel is indicated at 530. This undergoes Walsh spreading with the Walsh-0 sequence. More generally, any Walsh sequence other than that used for the other channels could be employed. However, when the Walsh-0 sequence is used effectively no Walsh spreading is employed and the RACH channel directly goes to multiplier 530 where a second PM cover is applied. The RACH channel content and the remaining content is combined in adder 532. The remaining elements of FIG. 10B are the same as those previously described in FIG. 3, and this will not be repeated here. It is noted that while two inputs are shown to adder 532, typically only one of them would be active at a given instant for a single UE. While the RACH is being used, the user is in an in-active state and as such is not transmitting on the data channels. Similarly, when the user is transmitting data, there is no need for the RACH. In this embodiment, it can be seen that the multiple transport channels 500,502 have their content coded and then interleaved prior to being spread by Walsh code sequences 514,516. With the appropriate block size selected in the encoders 504,506 advantageously encoded blocks will be spread across multiple sub-blocks and these sub-blocks are hopped as a result of hopping pattern 32.

Mode-2 Description

In another embodiment of the invention, Mode-2, preferably operated in combination with Mode-1, provides a rate-controlled high speed data burst with centralized scheduling transmission. Preferably, maximum power is employed so as to transmit at the highest possible rate in Mode-2, thereby maximizing throughput. Mode-2 supports a Time-Division Multiplex (TDM) multi-user service. Preferably, adaptive coding and modulation are employed to support high speed data burst.

Figure 12:
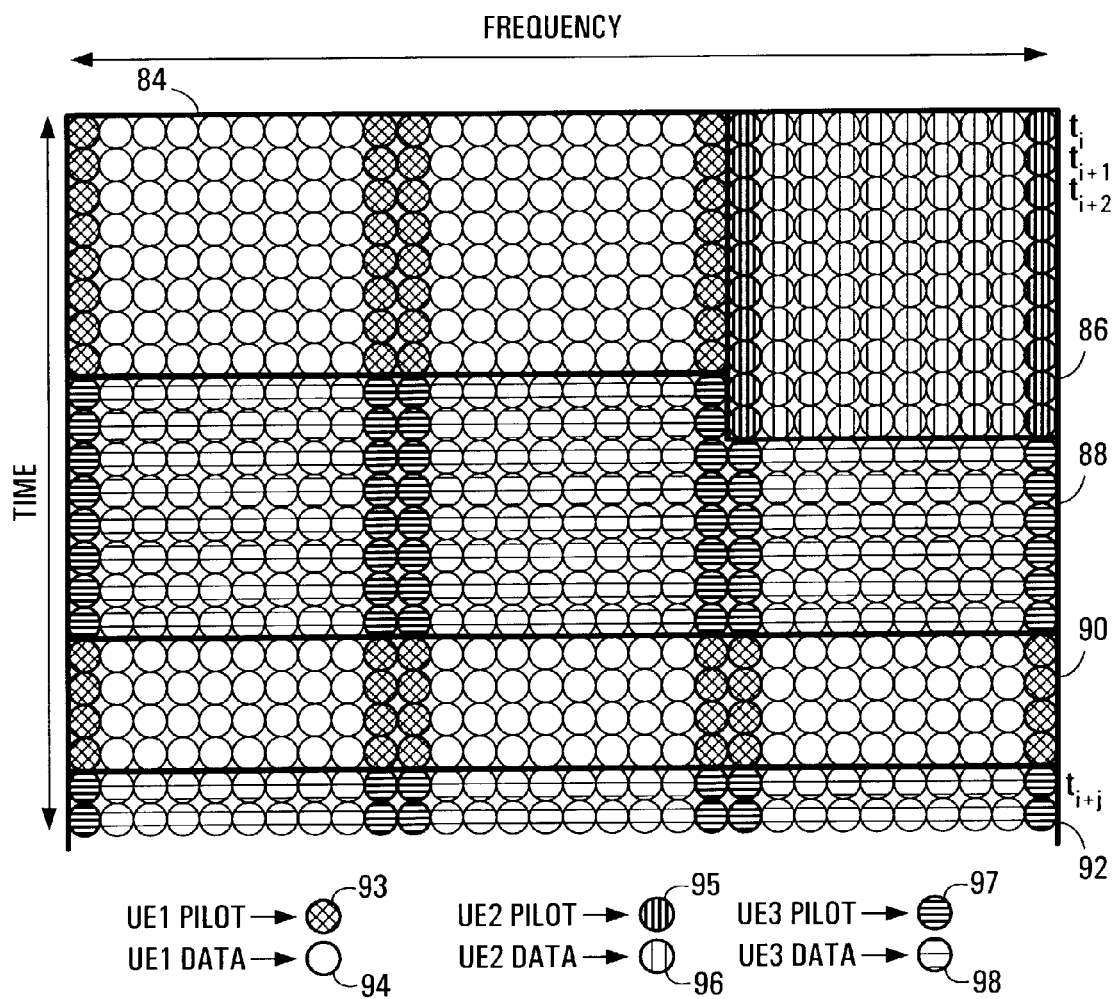
FIG. 12 is an example time-frequency diagram showing the allocation of OFDM sub-carriers for an example of Mode-2 operation.

Rate controlled FDM/TDM-OFDMA is used for the transmissions of multi-user high-speed data bursts. On the basis of the channel quality, QoS and the traffic load for each UE, the base station scheduler schedules the accesses for multiple users, including the channel resource allocation and coding/modulation scheme for each individual UE. Each UE can be assigned a group of STC sub-blocks. To obtain the time/frequency diversity the STC sub-blocks for each UE can hop in the frequency-time plane according to certain pattern. FIG. 12 gives an example of the STC sub-block assignment scheme between three UEs. However if we want to reduce the frequency synchronization requirement between different UE, we should group the STC sub-blocks assigned to a particular UE together to reduce the inter-user interference between STC sub-blocks for different UEs. The assigned STC sub-blocks can be considered as the dedicated fast traffic channel.

In the illustrated example, there is a frequency band assigned for Mode-2 operation which is wide enough for three STC sub-blocks. These can be assigned in any manner for Mode-2 operation. However, preferably they are assigned in contiguous blocks both in time and frequency. Thus, in the illustrated example shown is a first block of STC sub-blocks 84 consisting of two adjacent STC sub-blocks in frequency transmitted for four STC sub-blocks in time. This is used for user 1 pilot sub-carriers 93 and user 1 data sub-carriers 94. Similarly, a block 86 is shown for user 2 pilots 95 and data 96. In this case, the block consists of a single STC sub-block transmitted for five consecutive STC sub-blocks in frequency. A block of assigned sub-blocks for user 3 is indicated at 89 with user 3 pilot sub-carriers 97 and data sub-carriers 98. Other groupings of STC sub-blocks are shown as 90 and 92.

It is of course to be understood that the width of the band assigned for Mode-2 operation is arbitrary, and different numbers of STC sub-blocks may fit into the band thus defined. The size of the STC sub-blocks of course is variable, but preferably this is limited by the coherence bandwidth in frequency.

Figure 13:
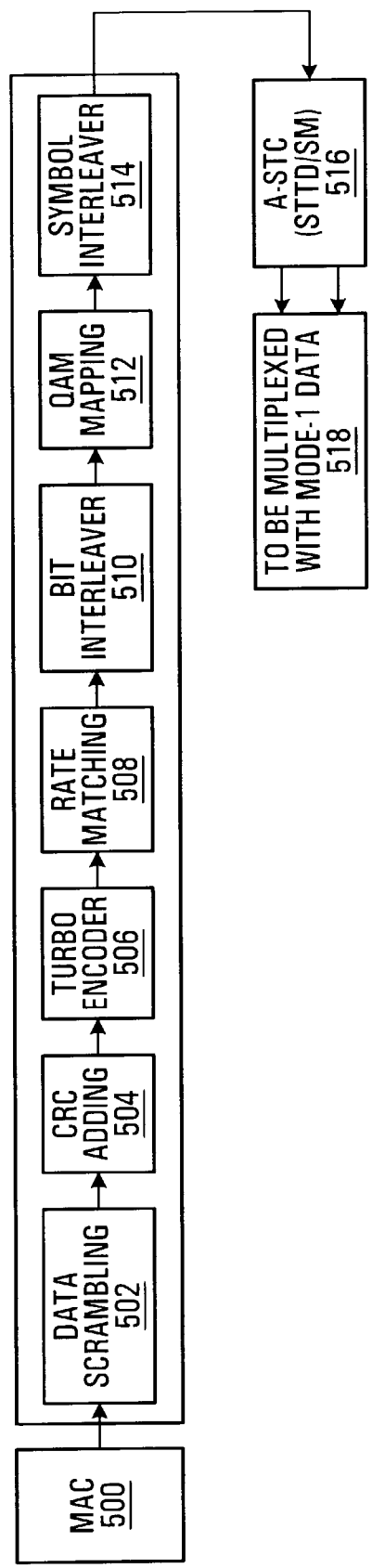
FIG. 13 is a block diagram of an example transmitter for Mode-2 operation.

FIG. 13 is a block diagram of transmitter functionality for Mode-2 operation. This example architecture includes MAC interface 500 through which is received a packet to be transmitted in Mode-2. The packet is then processed with data scrambler 502, CRC adding block 504, turbo encoder 506, rate matching block 508, bit interleaver 510, QAM mapping 512 and symbol interleaver 514 the output of which is fed to an A-STC function 516 which generates the output which is then multiplexed as indicated at 518 with Mode-1 data. It is to be understood that this diagram is a very specific example and that in general these blocks may not all be required.

It is noted that in the example assignment of STC sub-blocks for Mode-2 given in FIG. 12, the STC sub-blocks of a given user are contiguously assigned. In a preferred embodiment, the STC sub-blocks for Mode-2 transmission are also hopped in frequency. In this case, when the user is assigned the opportunity for Mode-2 transmission, the assignment needs to contain sufficient information to identify the hopping pattern so that each user can identify exactly where in a time and frequency there packet will be transmitted using STC sub-blocks.

Figure 15A:
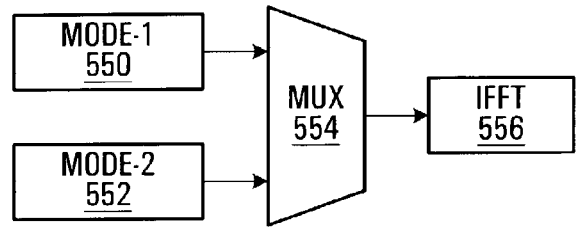
FIG. 15A is a block diagram of an example of how Mode-1 and Mode-2 signals are combined.
Figure 15B:
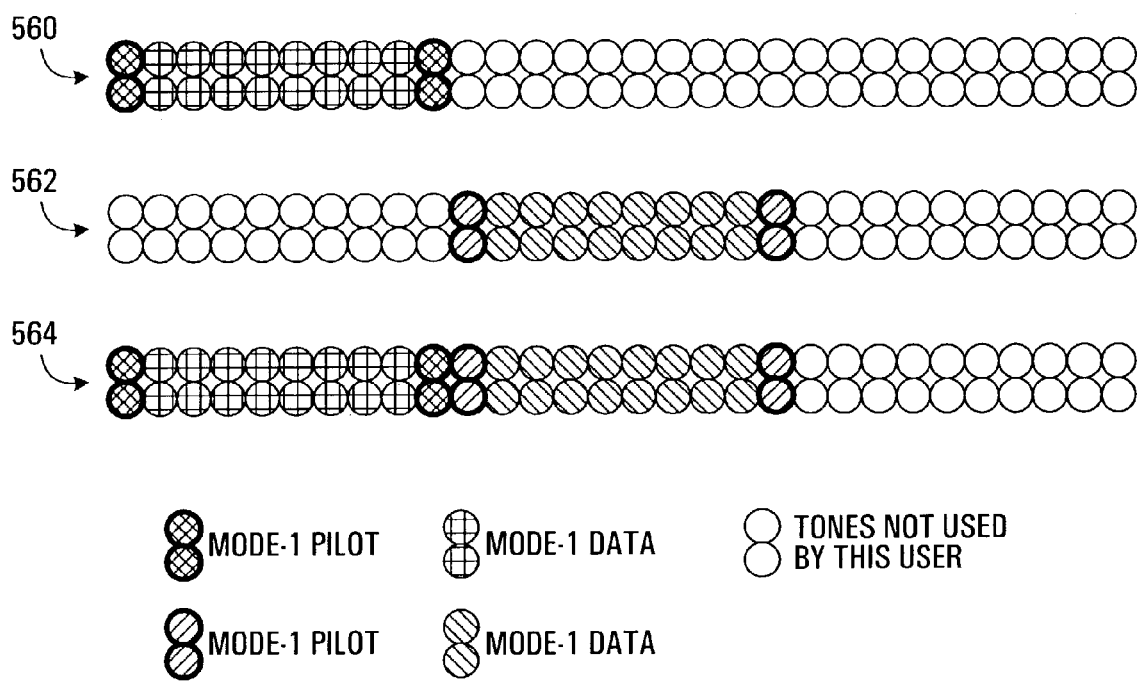
FIG. 15B shows an example in frequency-time of how Mode-1 and Mode-2 signals are combined.

FIG. 15B illustrates an example of how Mode-1 and Mode-2 are combined in a transmitter architecture. The Mode-1 output, for example is generated at the output of a hopping pattern of FIG. 3 or 10B, generally indicated by 550, and a Mode-2 output, generally indicated by 552, generated by the Mode-2 transmission architecture of FIG. 13 for example are both input to a multiplexer function 554 connected to the IFFT 556. This functionality would be implemented for each antenna. An example of how the multiplexing takes place is shown in FIG. 15B. Here, the Mode-1 input to the multiplexer 554 is generally indicated by 560 and the Mode-2 input to the multiplexer 554 is generally indicated by 562. After multiplexing, the input to the IFFT function 556 produced by the MUX 554 is generally indicated by 564.

The Uplink Rate Control

Figure 14:
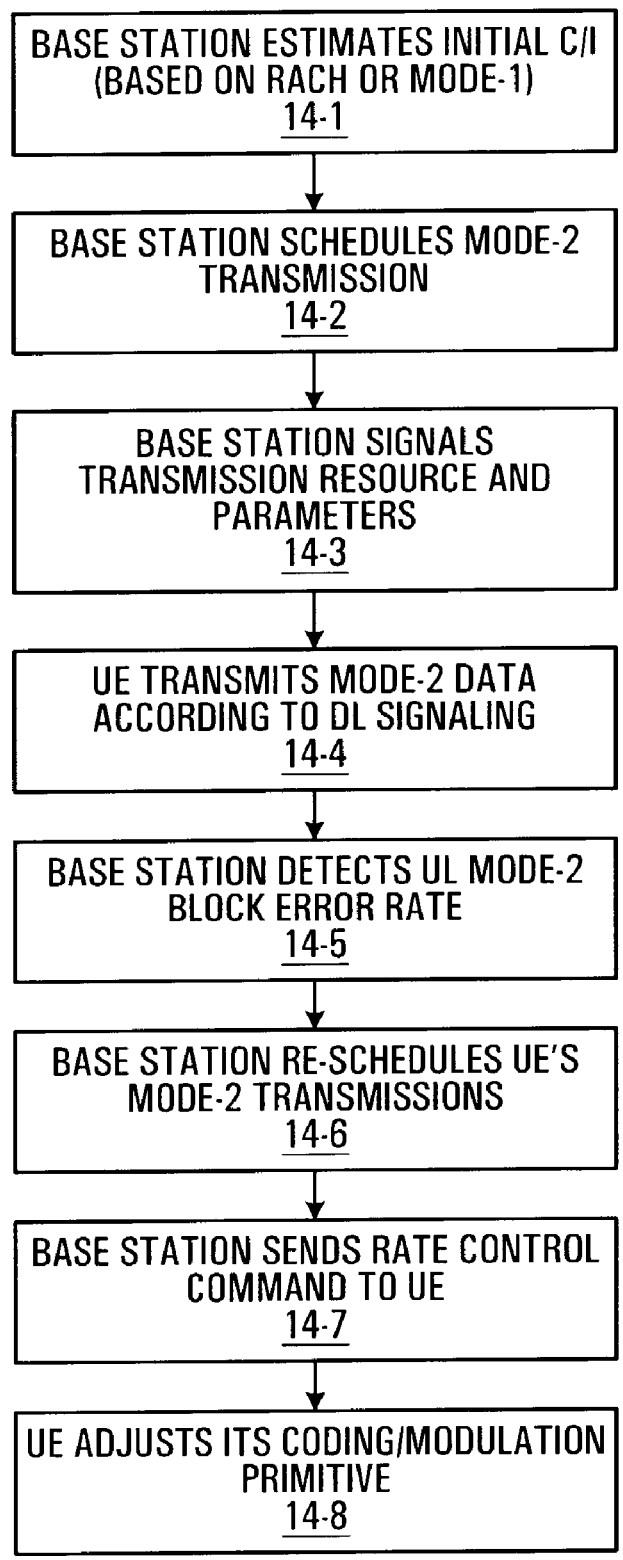
FIG. 14 is a flowchart for an example method of uplink rate control.

To realize the rate control, the scheduler needs C/I information for all active UEs. However because of the interference variability, it is difficult to measure uplink C/I. A new rate control loop can be applied in coding/modulation selection for Mode-2 transmission in uplink. An example uplink rate control and implementation is illustrated in the flowchart of FIG. 14.

Step 14-1. Base station measures the signal strengths of all active UEs based on the received pilots from Mode-1 transmissions.

Step 14-2. Base station schedules the initial multiple UE's access according to these initial measurements.

Step 14-3. Base station signals transmission resources and parameters to the UE.

Step 14-4. UE listens to the downlink signaling channel for the instruction of Mode-2 transmission, including the assigned STC Sub-Blocks and the coding/modulation primitive, and then starts the Mode-2 transmission.

Step 14-5. Base station detects the block error rate of the received data from UE. If the block error rate is higher/lower than target value, it sends a command to that UE to reduce/increase the transmit rate by changing the coding-modulation primitive.

Step 14-6. The base station reschedules the users Mode-2 transmissions.

Step 14-7. UE adjusts its coding-modulation primitive according to the rate control command.

Step 14-8. The base stations sends new rate control commands to the UE.

In another embodiment, the UE can measure the long term power strength from the serving base station and set the modulation by using multi-level progressive coding and modulation feed forward transmission. It is to be understood that other uplink rate control methods can be employed. Alternatively, a static rate can be assigned to each user for Mode-2 transmission.

Referring now to FIG. 1, shown is a system diagram for the OFDMA system. Shown is an OFDMA receiver generally indicated at 600 and two OFDMA transmitters 602,604. The OFDMA receiver 600 would typically be a base station while the OFDMA transmitter 602,604 is a wireless terminal such as a mobile station. The nomenclature used for these devices tends to be implementation specific. The functionality required on the network side can be referred to as "network terminals". This would encompass base stations, node-B's, repeaters, or any other system device in which this functionality is to be provided. Also shown is a downlink control channel(s) 652 from the OFDMA receiver 600 to the first OFDMA transmitter 602 and a downlink control channel(s) 650 from the OFDMA receiver 600 to the second OFDMA transmitter 604. The OFDMA receiver 600 is shown to include a RACH detection function 610, a Mode-2 rate control function 612, a Mode-1 power control function 614 and OFDMA reception functionality 616 which is responsible for receiving the Mode-1 and Mode-2 data of multiple users. Each OFDMA transmitter 602,604 has a respective Mode-1 function 618,630, a respective Mode-2 function 620,632, a respective RACH function 622,634 and a respective SACH function 624,636. It is to be understood that in the OFDMA receiver 600, typically many other functions would be required in a complete system. Furthermore, the functions which are shown can be implemented as separate physical blocks, or can be integrated into a single design implemented in software and/or hardware and/or firmware. The same is true for each of the OFDMA transmitters 602,604. Furthermore, it is to be understood that not all embodiments require all of the functional blocks shown in FIG. 1. For example, in an embodiment which does not employ the RACH, the RACH functional blocks 622,634 and 610 would not be employed. It is noted that a detailed structure of the downlink control channels 650 and 652 has not been provided. It is to be understood that any suitable downlink channel could be employed for this purpose.

Also shown in the OFDMA receiver 600 is a SACH assignment and monitoring function 617. Correspondingly, in the OFDMA transmitters 602,604 there are respective SACH generators 624,636. Each OFDMA transmitters 602,604 also are shown having a respective control channel receiver 640, 642.

What has been described is merely illustrative of the application of the principles of the invention. Other arrangements and methods can be implemented by those skilled in the art without departing from the spirit and scope of the present invention. Numerous modifications and variations of the present invention are possible in light of the above teachings. It is therefore to be understood that within the scope of the appended claims, the invention may be practiced otherwise than as specifically described herein.

The invention claimed is:

1. A wireless terminal for communicating over a shared OFDM band, the wireless terminal comprising:
    a first transmit chain configured to generate and transmit a low rate mode OFDM transmission in a first frequency band of the shared OFDM band in a first subset of a plurality of OFDM transmission intervals; and
    a second transmit chain configured to generate and transmit a burst-mode transmission in a second frequency band of the shared OFDM band in a second subset of the plurality of OFDM transmission intervals,
    the first subset of the plurality of OFDM transmission intervals having at least one OFDM transmission interval in common with the second subset of the plurality of OFDM transmission intervals,
    wherein for the at least one OFDM transmission interval common between the first subset and the second subset, the first frequency band is non-overlapping in frequency with the second frequency band.

2. A wireless terminal according to claim 1 wherein the first transmit chain is power controlled and the second transmit chain is rate controlled.

3. A wireless terminal according to claim 2 wherein the first transmit chain further comprises:
    at least one low rate signal source;
    for each low rate signal source, at least one distinct orthogonal spreading function configured to generate a respective spread sequence for each symbol of the low rate signal source by multiplying the symbol by a respective orthogonal spreading function from a set of orthogonal spreading functions;
    a combiner for adding together in time the spread sequences to generate a composite sequence to be transmitted using said first frequency band.

4. A wireless terminal according to claim 3 comprising a plurality N of transmit antennas, N>=2, wherein the first transmit chain comprises a space time encoder configured to perform space time encoding to generate a respective STC sub-block comprising M symbols for sub-carriers by N transmission intervals to be transmitted on each transmit antenna during each set of N OFDM transmission intervals as said low rate mode OFDM transmission, wherein the composite sequence is input to the space time encoder.

5. A wireless terminal according to claim 3 wherein the set of orthogonal spreading functions comprises Walsh codes.

6. A wireless terminal according to claim 3 wherein the at least one low rate signal source comprises at least one of:
    DL (downlink) channel condition (CQI/CLI) feedback channel;
    DL ACK/NAK signaling channel;
    UL (uplink) buffer status channel;
    UL transmit power margin channel;
    UL rate indicator channel;
    UL fixed data rate dedicated traffic channel.

7. A wireless terminal according to claim 3 further configured to apply a variable number of Walsh code channels to the at least one low rate signal source as a function of required data rate and/or need for protection.

8. A wireless terminal according to claim 3 further comprising:
    a control channel receiver for receiving power control commands in respect of the low rate mode OFDM transmissions;
    a power control function configured to apply transmit power adjustments to the low rate mode OFDM transmissions as a function of the power control commands.

9. A wireless terminal according to claim 3 further comprising:
    a cover code generator configured to apply a cell specific cover code in generating all low rate mode OFDM transmissions.

10. A wireless terminal according to claim 9 wherein the STC block size is N×M plus pilot carriers, where M is such that the block size is less than the coherence bandwidth.

11. A wireless terminal according to claim 2 further comprising a power control function configured to:
    transmit an initial access attempt on an uplink access channel;
    determine a long term estimated downlink power measurement of a signal received over a downlink channel and to initially transmit said low rate mode OFDM transmission at a transmit power determined as a function of the estimated downlink power measurement;
    control channel receiver for receiving power control commands for increasing/unchanging/decreasing transmit power of the low rate mode OFDM transmission after said initial access attempt.

12. A wireless terminal according to claim 2 further comprising:
a control channel receiver for receiving channel assignment information allowing an identification of where in frequency and when in time to transmit the low rate mode OFDM transmissions.

13. A wireless terminal according to claim 2 further comprising:
an access channel transmit chain configured to generate an OFDM access signal occupying a randomly selected slot selected from a plurality of slots comprising a frame, each slot comprising a predetermined block of OFDM time-frequency.

14. A wireless terminal according to claim 13 further comprising:
a control channel receiver for receiving an identity of a plurality of signature definitions for use in a coverage area;
wherein the wireless terminal randomly selects one of the plurality of signatures and applies the signature in generating the access attempt.

15. A wireless terminal according to claim 13 wherein each slot comprises four OFDM symbols, and there are 16 different possible signatures.

16. A wireless terminal according to claim 13 further configured to map the signature onto OFDM carriers based on a Peano-Hilbert plane filling curve.

17. A wireless terminal according to claim 13 wherein the access channel is overlaid over low rate mode OFDM transmissions of other wireless terminals.

18. A wireless terminal according to claim 2 configured to function in an active and standby state, and further comprising:
a control channel receiver for receiving a system access channel assignment upon entering the standby state, the system access channel assignment being associated with specific sub-carriers and OFDM symbols to be used as a system access channel;
wherein the wireless terminal is further configured to use the system access channel to transmit a pilot and system access requests while in the standby state.

19. A wireless terminal according to claim 18 wherein the system access channel comprises two or more sub-carriers allocated during certain periodic OFDM symbols.

20. A wireless terminal according to claim 19 wherein the system access channel is used to transmit differentially encoded access requests including at least one state that indicates a request for low rate mode and/or burst mode capacity to be scheduled.

21. A wireless terminal according to claim 2 configured to function in an active and standby state, and further comprising:
a control channel receiver for receiving a system access channel assignment upon entering the standby state, the system access channel assignment being associated with specific sub-carriers and OFDM symbols to be used as a system access channel;
wherein the wireless terminal is further configured to use the system access channel to transmit a pilot and system access requests while in the standby state.

22. A wireless terminal according to claim 21 wherein the system access channel comprises two or more sub-carriers allocated during certain periodic OFDM symbols.

23. A wireless terminal according to claim 22 wherein the system access channel is used to transmit differentially encoded access requests including at least one state that indicates a request for low rate mode and/or burst mode capacity to be scheduled.

24. A wireless terminal according to claim 1, further comprising:
an access channel transmit chain configured to generate an OFDM access signal occupying a randomly selected slot selected from a plurality of slots comprising a frame, each slot comprising a predetermined block of OFDM time-frequency.

25. A wireless terminal according to claim 24 further comprising:
a control channel receiver for receiving an identity of a plurality of signature definitions for use in a coverage area;
wherein the wireless terminal randomly selects one of the plurality of signatures and applies the signature in generating the access attempt.

26. A wireless terminal according to claim 24 wherein each slot comprises four OFDM symbols, and there are 16 different possible signatures.

27. A wireless terminal according to claim 24 further configured to map the signature onto OFDM carriers based on a Peano-Hilbert plane filling curve.

28. A wireless terminal according to claim 24 wherein the access channel is overlaid over low rate mode OFDM transmissions of other wireless terminals.

29. A wireless terminal for communicating over a shared OFDM band, the wireless terminal comprising:
a first transmit chain for generating and transmitting a low rate mode OFDM transmission in a first frequency band of the shared OFDM band,
the first transmit chain comprises a hopping pattern generator which causes the first frequency band to hop around in frequency within a first subset of the shared OFDM band allocated for low rate mode OFDM transmission, wherein for at least a subset of a plurality of OFDM transmission intervals, a second subset of the shared OFDM band is allocated for burst-mode transmission, and the first subset of the shared OFDM band allocated for low rate mode OFDM transmission in the at least a subset of the plurality of OFDM transmission intervals is non-overlapping in frequency with the second subset of the shared OFDM band allocated for burst-mode OFDM transmission.

30. A wireless terminal according to claim 29 wherein:
the first transmit chain comprises a space time encoder configured to perform space time encoding to generate a signal to be transmitted during each OFDM transmission interval as said low rate mode OFDM transmission.

31. A wireless terminal according to claim 29 comprising a plurality N of transmit antennas, N>=2, wherein the first transmit chain comprises a space time encoder configured to perform space time encoding to generate a respective STC sub-block comprising symbols for M sub-carriers by N transmission intervals to be transmitted on each transmit antenna during each set of N OFDM transmission intervals as said low rate mode OFDM transmission.

32. A wireless terminal according to claim 31 wherein:
the hopping pattern generator generates hops with a unit of hopping equal to a size of the STC blocks.

33. A wireless terminal according to claim 32 further comprising a control channel receiver for receiving channel assignment information allowing an identification of where in frequency and when in time to transmit the low rate mode OFDM transmissions wherein the channel assignment information comprises a hopping pattern identity which allows the wireless terminal to perform hopping in accordance with one of a set of orthogonal hopping patterns.

34. A wireless terminal according to claim 32 further comprising:
at least one channel coder configured to apply channel coding to low rate signal sources prior to forming STC blocks.

35. A wireless terminal according to claim 34 wherein the channel coders have a block size that covers several hops to achieve diversity gain and inter-cell interference averaging.

36. A wireless terminal according to claim 31 wherein each STC sub-block further comprises pilot symbols.

37. A wireless terminal according to claim 31 wherein each STC sub-block further comprises N pilot symbols on a respective single sub-carrier on each end of the STC sub-block.

38. A wireless terminal according to claim 29 further comprising:
a second transmit chain for generating and transmitting a burst-mode OFDM transmission occupying an assigned space in OFDM frequency-time within the second subset of the shared OFDM band allocated for burst-mode OFDM transmission.

39. A wireless terminal according to claim 38 wherein:
the second transmit chain comprises a space time encoder configured to perform space time encoding to generate a signal to be transmitted during a plurality of OFDM transmission intervals as said burst-mode OFDM transmission.

40. A wireless terminal according to claim 39 further configured to measure a long term power strength from a serving transmitter and to set a coding/modulation by using multi-level progressive coding and modulation feed forward transmission.

41. A wireless terminal according to claim 39 wherein the second transmit chain comprises a hopping pattern generator which defines said assigned STC sub-block transmission frequency-time locations such that they hop about in frequency within the second subset of the shared OFDM band allocated for burst-mode traffic.

42. A wireless terminal according to claim 38 comprising a plurality N of transmit antennas, N>=2, wherein the second transmit chain comprises a space time encoder configured to perform space time encoding to generate for each of a plurality of assigned STC sub-block transmission frequency-time locations a respective STC sub-block to be transmitted on each transmit antenna.

43. A wireless terminal according to claim 42 wherein each STC sub-block further comprises pilot symbols.

44. A wireless terminal according to claim 42 wherein each STC sub-block further comprises N pilot symbols on each end of the STC sub-block on a respective single OFDM sub-carrier.

45. A wireless terminal according to claim 42 further comprising a control channel receiver for receiving a downlink signaling channel containing instructions for burst mode transmission.

46. A wireless terminal according to claim 45 wherein the instructions comprise a definition of the assigned STC sub-block transmission frequency-time space and a coding/modulation primitive.

47. A wireless terminal according to claim 46 wherein the instructions further comprise rate control commands, the wireless terminal being configured to change the coding/modulation primitive according to the rate control commands.

48. A wireless terminal according to claim 38 further comprising:
an access channel transmit chain configured to generate an OFDM access signal occupying a randomly selected slot selected from a plurality of slots comprising a frame, each slot comprising a predetermined block of OFDM time-frequency.

49. A wireless terminal according to claim 38 configured to function in an active and standby state, and further comprising:
a control channel receiver for receiving a system access channel assignment upon entering the standby state, the system access channel assignment being associated with specific sub-carriers and OFDM symbols to be used as a system access channel;
wherein the wireless terminal is further configured to use the system access channel to transmit a pilot and system access requests while in the standby state.

50. A wireless terminal according to claim 49 configured to function in an active and standby state, and further comprising:
a control channel receiver for receiving a system access channel assignment upon entering the standby state, the system access channel assignment being associated with specific sub-carriers and OFDM symbols to be used as a system access channel;
wherein the wireless terminal is further configured to use the system access channel to transmit a pilot and system access requests while in the standby state.

51. A wireless terminal according to claim 29 further comprising:
a second transmit chain for generating and transmitting a burst-mode OFDM transmission occupying an assigned space in OFDM frequency-time within the second subset of the shared OFDM band allocated for burst-mode OFDM transmission.

52. A wireless terminal according to claim 51 wherein:
the second transmit chain comprises a space time encoder configured to perform space time encoding to generate a signal to be transmitted during a plurality of OFDM transmission intervals as said burst-mode transmission.

53. A wireless terminal according to claim 51 comprising a plurality N of transmit antennas, N>=2, wherein the second transmit chain comprises a space time encoder configured to perform space time encoding to generate for each of a plurality of assigned STC sub-block transmission frequency-time locations a respective STC sub-block to be transmitted on each transmit antenna.

54. A wireless terminal according to claim 53 wherein each STC sub-block further comprises pilot symbols.

55. A wireless terminal according to claim 53 wherein each STC sub-block further comprises N pilot symbols on each end of the STC sub-block on a respective single OFDM sub-carrier.

56. A wireless terminal according to claim 53 further comprising a control channel receiver for receiving a downlink signaling channel containing instructions for burst mode transmission.

57. A wireless terminal according to claim 53 wherein the instructions comprise a definition of the assigned STC sub-block transmission frequency-time locations and a coding/modulation primitive.

58. A wireless terminal according to claim 57 wherein the instructions further comprise rate control commands, the wireless terminal being configured to change the coding/modulation primitive according to the rate control commands.

59. A wireless terminal according to claim 53 wherein the second transmit chain comprises a hopping pattern generator which defines said assigned STC sub-block transmission frequency-time locations such that they hop about in frequency within the second subset of the shared OFDM band allocated for burst-mode traffic.

60. A wireless terminal according to claim 51 further configured to measure a long term power strength from a serving base station and to set a coding/modulation by using multi-level progressive coding and modulation feed forward transmission.

61. A network terminal for receiving communications over a shared OFDM band, the network terminal comprising:
a receiver for receiving burst-mode OFDM transmissions over a first frequency of the shared OFDM band in a first frequency of a plurality of OFDM transmission intervals and for receiving low rate mode OFDM transmissions over a second subset of the shared OFDM band in a second subset of the plurality of OFDM transmission intervals, the first subset of the plurality of OFDM transmission intervals having at least one OFDM transmission interval in common with the second subset of the plurality of OFDM transmission intervals, the first subset of the shared OFDM band being non-overlapping in frequency with the second subset of the shared OFDM band.

62. The network terminal according to claim 61 further configured to:
extract burst-mode OFDM transmissions of multiple wireless terminals from said first subset and extract low rate mode OFDM transmissions of multiple wireless terminals from the second subset.

63. A network terminal according to claim 61 further comprising:
a control channel output for controlling frequency-time locations with which wireless terminals are to transmit their low rate mode transmissions.

64. A network terminal according to claim 63 wherein the control channel identifies to each wireless terminal a respective orthogonal hopping pattern for low rate mode OFDM transmission.

65. A network terminal according to claim 61 further comprising:
a power control function configured to determine a quality of low rate mode OFDM transmissions for each wireless terminal transmitting low rate OFDM transmissions and to generate power control signals in respect of the low rate mode OFDM transmissions for each wireless terminal transmitting low rate OFDM transmissions.

66. A network terminal according to claim 65 further configured to:
for each standby wireless terminal in a state, assign a respective system access channel and transmit an identity of the respective system access channel over a control channel;
the network terminal being further configured to monitor the system access channels for requests for capacity from wireless terminals in the standby state.

67. A network terminal according to claim 66 further configured to maintain timing and synchronization using the system access channels for wireless terminals in the standby state.

68. A network terminal according to claim 66 wherein the requests for capacity comprise requests for burst-mode or low rate mode capacity.

69. A network terminal according to claim 61 further comprising:
a control channel output for controlling which wireless terminals are to transmit burst-mode OFDM transmissions.

70. A network terminal according to claim 69 wherein control channel output identifies for each wireless terminal to transmit a burst-mode OFDM transmission where in frequency and when in time to transmit the burst-mode OFDM transmission.

71. A network terminal according to claim 69 further configured to perform adaptive rate control over the burst-mode transmission.

72. A network terminal according to claim 61 further configured to monitor a random access channel, the random access channel comprising: a plurality of slots, each slot comprising a plurality of OFDM symbol intervals, and for each slot a plurality M of signatures for receiving up to M access attempts during one slot, the slots being overlaid over transmissions of active wireless terminals.

73. A network terminal according to claim 72 further configured to transmit an identity of the signatures for use on the random access channel.

74. A network terminal according to claim 73 further configured to grant system access on the basis of detected access attempts on the random access channel.

75. A method of communicating over a shared OFDM band comprising:
generating and transmitting a low rate mode OFDM transmission in a first frequency band of the shared OFDM band in a first subset of a plurality of OFDM transmission intervals; and
generating and transmitting a burst-mode OFDM transmission in a second frequency band of the shared OFDM band in a second subset of the plurality of OFDM transmission intervals,
the first subset of the plurality of OFDM transmission intervals having at least one OFDM transmission interval in common with the second subset of the plurality of OFDM transmission intervals,
wherein for the at least one OFDM transmission interval common between the first subset and the second subset, the first frequency band is non-overlapping in frequency with the second frequency band.

76. A method according to claim 75 further comprising:
receiving power control commands and controlling transmit power of the low rate mode OFDM transmission as a function of the power control commands;
receiving rate control commands and controlling transmission rate of the burst-mode OFDM transmission as a function of the rate control commands.

* * * * *